United States Patent
Wei

(10) Patent No.: US 11,393,166 B2
(45) Date of Patent: Jul. 19, 2022

(54) GENERATING REPRESENTATIONS TO APPROXIMATE DIGITAL SHAPES USING SAMPLE CIRCLES

(71) Applicant: Adobe Inc., San Jose, CA (US)

(72) Inventor: Li-Yi Wei, Redwood City, CA (US)

(73) Assignee: Adobe Inc., San Jose, CA (US)

( * ) Notice: Subject to any disclaimer, the term of this patent is extended or adjusted under 35 U.S.C. 154(b) by 35 days.

(21) Appl. No.: 16/855,607

(22) Filed: Apr. 22, 2020

(65) Prior Publication Data
US 2021/0335037 A1    Oct. 28, 2021

(51) Int. Cl.
| | |
|---|---|
| G06T 17/10 | (2006.01) |
| G06T 11/20 | (2006.01) |
| G06V 10/22 | (2022.01) |
| G06V 10/42 | (2022.01) |
| G06V 10/44 | (2022.01) |

(52) U.S. Cl.
CPC ............ G06T 17/10 (2013.01); G06T 11/20 (2013.01); G06V 10/22 (2022.01); G06V 10/42 (2022.01); G06V 10/44 (2022.01)

(58) Field of Classification Search
CPC ....... G06T 17/10; G06T 11/20; G06K 9/4604; G06K 9/2054; G06K 9/52
See application file for complete search history.

(56) References Cited

U.S. PATENT DOCUMENTS

| | | | | |
|---|---|---|---|---|
| 6,157,750 A | * | 12/2000 | Choi | G06T 3/0093 |
| | | | | 382/301 |
| 6,822,652 B1 | * | 11/2004 | Browne | G06T 11/40 |
| | | | | 345/470 |
| 2017/0358097 A1 | * | 12/2017 | Watanabe | G06T 7/149 |
| 2018/0033194 A1 | * | 2/2018 | Goel | G06T 15/06 |

OTHER PUBLICATIONS

Wikipedia, Line (geometry). https://web.archive.org/web/20160212042342/https://en.wikipedia.org/wiki/Line_(geometry) (Year: 2016).*
Nina Amenta, Sunghee Choi, and Ravi Krishna Kolluri. 2001. The Power Crust. In SMA '01. 249-266.
Chen-Yuan Hsu, Li-Yi Wei, Lihua You, and Jian Jun Zhang. 2020. Autocomplete Element Fields. In CHI '20. to appear.
Project Nayuki. 2018. Smallest enclosing circle. (2018).
(Continued)

*Primary Examiner* — Sing-Wai Wu
(74) *Attorney, Agent, or Firm* — Keller Preece PLLC

(57) ABSTRACT

The present disclosure relates to systems, methods, and non-transitory computer-readable media that generate sample circle representations for digital shapes. For example, the disclosed systems can generate a sample circle representation for a digital shape by selecting a subset of sample circles generated using a medial axis corresponding to the digital shape. In some embodiments, the disclosed systems generate the sample circle representation for the digital shape by generating one or more enclosing circles based on one or more sampled boundary points of the digital shape. In some embodiments, the disclosed systems generate the sample circle representation for the digital shape by further connecting the sample circles generated for the digital shape.

20 Claims, 12 Drawing Sheets

(56) References Cited

OTHER PUBLICATIONS

Szymon Rusinkiewicz and Marc Levoy. 2000. QSplat: A multiresolution point rendering system for large meshes. In SIGGRAPH '00. 343-352.
Floris Steenkamp. 2019. Medial (and Scale) Axis Transform library—SVG focused. (2019).
Svetlana Stolpner, Paul Kry, and Kaleem Siddiqi. 2012. Medial Spheres for Shape Approximation. IEEE Trans. Pattern Anal. Mach. Intell. 34, 6 (2012), 1234-1240.
Jean-Marc Thiery, Émilie Guy, and Tamy Boubekeur. 2013. Sphere-Meshes: Shape Approximation Using Spherical Quadric Error Metrics. ACM Trans. Graph. 32, 6, Article 178 (2013), 12 pages.
Rui Wang, Kun Zhou, John Snyder, Xinguo Liu, Hujun Bao, Qunsheng Peng, and Baining Guo. 2006. Variational Sphere Set Approximation for Solid Objects. Vis. Comput. 22, 9 (2006), 612-621.
Wikipedia. 2019. Smallest-circle problem. (2019).
Zainab AlMeraj, Craig S. Kaplan, and Paul Asente. 2013. Patch-based Geometric Texture Synthesis. In CAE '13. 15-19.
F Aurenhammer. 1987. Power Diagrams: Properties, Algorithms and Applications. SIAM J. Comput. 16, 1 (1987), 78-96.
Cyprien Buron, Jean-Eudes Marvie, Gaël Guennebaud, and Xavier Granier. 2015. Dynamic On-mesh Procedural Generation. In GI '15. 17-24.
Guoning Chen, Vivek Kwatra, Li-Yi Wei, Charles D. Hansen, and Eugene Zhang. 2012. Design of 2D Time-Varying Vector Fields. IEEE Transactions on Visualization and Computer Graphics 18, 10 (2012), 1717-1730.
Weikai Chen, Yuexin Ma, Sylvain Lefebvre, Shiqing Xin, Jonàs Martínez, and wenping wang. 2017. Fabricable Tile Decors. ACM Trans. Graph. 36, 6, Article 175 (2017), 15 pages.
Jun Han Cho, Athena Xenakis, Stefan Gronsky, and Apurva Shah. 2007. Anyone Can Cook—Inside Ratatouille's Kitchen. In SIGGRAPH 2007 Courses.
David Cohen-Steiner, Pierre Alliez, and Mathieu Desbrun. 2004. Variational Shape Approximation. ACM Trans. Graph. 23, 3 (2004), 905-914.
Teela Cunningham. 2015. How to Create Seamless Patterns in Illustrator. (2015). https://www.youtube.com/watch?v=ITRZ75OKrG0.
Ketan Dalal, Allison W. Klein, Yunjun Liu, and Kaleigh Smith. 2006. A Spectral Approach to NPR Packing. In NPAR '06. 71-78.
Timothy Davison, Faramarz Samavati, and Christian Jacob. 2019. Interactive example-palettes for discrete element texture synthesis. Computers & Graphics 78 (2019), 23-36.
Song-Pei Du, Shi-Min Hu, and Ralph R. Martin. 2013. Semiregular Solid Texturing from 2D Image Exemplars. IEEE Transactions on Visualization and Computer Graphics 19, 3 (2013), 460-469.
Jérémie Dumas, Jonàs Martínez, Sylvain Lefebvre, and Li-Yi Wei. 2018. Printable Aggregate Elements. CoRR abs/1811.02626 (2018).
Arnaud Emilien, Ulysse Vimont, Marie-Paule Cani, Pierre Poulin, and Bedrich Benes. 2015. WorldBrush: Interactive Example-based Synthesis of Procedural Virtual Worlds. ACM Trans. Graph. 34, 4, Article 106 (2015), 11 pages.
Freepik. 2019. Graphic resources for everyone. (2019). https://www.freepik.com/.
Leonhard Frehse. 2018. AutoModeller Pro. (2018). http://www.automodeller.com/.
Ran Gal, Olga Sorkine, Tiberiu Popa, Alla Sheffer, and Daniel Cohen-Or. 2007. 3D Collage: Expressive Non-realistic Modeling. In NPAR 2007. 7-14.
Clovis Gay. 2016a. PhysX Painter. (2016). http://www.scriptspot.com/3ds- max/scripts/physx-painter.
Clovis Gay. 2016b. PhysX Painter Teaser. (2016). https://vimeo.com/162046605.
Eric Guérin, Eric Galin, François Grosbellet, Adrien Peytavie, and Jean-David Génevaux. 2016. Efficient modeling of entangled details for natural scenes. Computer Graphics Forum 35, 7 (2016), 257-267.

Alejo Hausner. 2001. Simulating Decorative Mosaics. In SIGGRAPH '01. 573-580.
Aaron Hertzmann and Denis Zorin. 2000. Illustrating Smooth Surfaces. In SIGGRAPH '00. 517-526.
Chen-Yuan Hsu, Li-Yi Wei, Lihua You, and Jian Jun Zhang. 2018. Brushing Element Fields. In SIGGRAPH Asia 2018 Technical Briefs (SA '18). Article 6, 4 pages.
Shu-Wei Hsu and John Keyser. 2010. Piles of Objects. ACM Trans. Graph. 29, 6, Article 155 (2010), 6 pages.
Shu-Wei Hsu and John Keyser. 2012. Automated Constraint Placement to Maintain Pile Shape. ACM Trans. Graph. 31, 6, Article 150 (2012), 6 pages.
Wenchao Hu, Zhonggui Chen, Hao Pan, Yizhou Yu, Eitan Grinspun, and Wenping Wang. 2016. Surface Mosaic Synthesis with Irregular Tiles. IEEE Transactions on Visualization and Computer Graphics 22, 3 (2016), 1302-1313.
Hua Huang, Lei Zhang, and Hong-Chao Zhang. 2011. Arcimboldo-like Collage Using Internet Images. ACM Trans. Graph. 30, 6, Article 155 (2011), 8 pages.
Zhiyang Huang and Tao Ju. 2016. Extrinsically smooth direction fields. Computers & Graphics 58 (2016), 109-117.
Zhe Huang, Jiang Wang, Hongbo Fu, and Rynson W. H. Lau. 2014. Structured Mechanical Collage. IEEE Transactions on Visualization and Computer Graphics 20, 7 (2014), 1076-1082.
Takashi Ijiri, Radomír Měch, Takeo Igarashi, and Gavin Miller. 2008. An Example-based Procedural System for Element Arrangement. Computer Graphics Forum 27, 2 (2008), 429-436.
Robert Jagnow, Julie Dorsey, and Holly Rushmeier. 2004. Stereological Techniques for Solid Textures. ACM Trans. Graph. 23, 3 (2004), 329-335.
Evangelos Kalogerakis, Derek Nowrouzezahrai, Simon Breslav, and Aaron Hertzmann. 2012. Learning Hatching for Pen-and-ink Illustration of Surfaces. ACM Trans. Graph. 31, 1, Article 1 (2012), 17 pages.
Rubaiat Habib Kazi, Fanny Chevalier, Tovi Grossman, Shengdong Zhao, and George Fitzmaurice. 2014. Draco: Bringing Life to Illustrations with Kinetic Textures. In CHI '14. 351-360.
Rubaiat Habib Kazi, Takeo Igarashi, Shengdong Zhao, and Richard Davis. 2012. Vignette: Interactive Texture Design and Manipulation with Freeform Gestures for Pen-and-ink Illustration. In CHI '12. 1727-1736.
Junhwan Kim and Fabio Pellacini. 2002. Jigsaw Image Mosaics. ACM Trans. Graph. 21, 3 (2002), 657-664.
Yeojin Kim, Byungmoon Kim, and Young J. Kim. 2018. Dynamic Deep Octree for High-resolution Volumetric Painting in Virtual Reality. Computer Graphics Forum 37, 7 (2018), 179-190.
Johannes Kopf, Chi-Wing Fu, Daniel Cohen-Or, Oliver Deussen, Dani Lischinski, and Tien-Tsin Wong. 2007. Solid Texture Synthesis from 2D Exemplars. ACM Trans. Graph. 26, 3, Article 2 (2007).
Kin Chung Kwan, Lok Tsun Sinn, Chu Han, Tien-Tsin Wong, and Chi-Wing Fu. 2016. Pyramid of Arclength Descriptor for Generating Collage of Shapes. ACM Trans. Graph. 35, 6, Article 229 (2016), 12 pages.
Pierre-Edouard Landes, Bruno Galerne, and Thomas Hurtut. 2013. A Shape-aware Model for Discrete Texture Synthesis. In EGSR '13. Aire-la-Ville, Switzerland, Switzerland, 67-76.
Moshe Levis. 2014. Tutorial on How to do a typography design of a woman's face in Photoshop CC. (2014). https://www.youtube.com/watch?v=LcZFp1s1AQI.
Pan Li, Bin Wang, Feng Sun, Xiaohu Guo, Caiming Zhang, and Wenping Wang. 2015. Q-MAT: Computing Medial Axis Transform By Quadratic Error Minimization. ACM Trans. Graph. 35, 1, Article 8 (2015), 16 pages.
Yuanyuan Li, Fan Bao, Eugene Zhang, Yoshihiro Kobayashi, and Peter Wonka. 2011. Geometry Synthesis on Surfaces Using Field-Guided Shape Grammars. IEEE Transactions on Visualization and Computer Graphics 17, 2 (2011), 231-243.
Hugo Loi, Thomas Hurtut, Romain Vergne, and Joëlle Thollot. 2013. Discrete Texture Design Using a Programmable Approach. In SIGGRAPH '13 Talks. Article 43, 1 pages.
Hugo Loi, Thomas Hurtut, Romain Vergne, and Joelle Thollot. 2017. Programmable 2D Arrangements for Element Texture Design. ACM Trans. Graph. 36, 3, Article 27 (2017), 17 pages.

(56) References Cited

OTHER PUBLICATIONS

Jingwan Lu, Connelly Barnes, Stephen DiVerdi, and Adam Finkelstein. 2013. RealBrush: Painting with Examples of Physical Media. ACM Trans. Graph. 32, 4, Article 117 (2013), 12 pages.

Jingwan Lu, Connelly Barnes, Connie Wan, Paul Asente, Radomir Mech, and Adam Finkelstein. 2014. DecoBrush: Drawing Structured Decorative Patterns by Example. ACM Trans. Graph. 33, 4, Article 90 (2014), 9 pages.

Jingwan Lu, Fisher Yu, Adam Finkelstein, and Stephen DiVerdi. 2012. HelpingHand: Example-based Stroke Stylization. ACM Trans. Graph. 31, 4, Article 46 (2012), 10 pages.

M. Lukác, J. Fišer, P. Asente, J. Lu, E. Shechtman, and D. Sýkora. 2015. Brushables: Example-based Edge-aware Directional Texture Painting. Comput. Graph. Forum 34, 7 (2015), 257-267.

Michal Lukác, Jakub Fišer, Jean-Charles Bazin, Ond$^{\vee}$rej Jamriška, Alexander Sorkine-Hornung, and Daniel Sýkora. 2013. Painting by Feature: Texture Boundaries for Example-based Image Creation. ACM Trans. Graph. 32, 4, Article 116 (2013), 8 pages.

Chongyang Ma, Li-Yi Wei, Sylvain Lefebvre, and Xin Tong. 2013. Dynamic Element Textures. ACM Trans. Graph. 32, 4, Article 90 (2013), 10 pages.

Chongyang Ma, Li-Yi Wei, and Xin Tong. 2011. Discrete Element Textures. ACM Trans. Graph. 30, 4, Article 62 (2011), 10 pages.

K. Madsen, H. B. Nielsen, and O. Tingleff. 2004. Methods for Non-Linear Least Squares Problems (2nd ed.). (2004). http://www2.imm.dtu.dk/pubdb/views/ publication_details.php?id=3215.

Ron Maharik, Mikhail Bessmeltsev, Alla Sheffer, Ariel Shamir, and Nathan Carr. 2011. Digital Micrography. ACM Trans. Graph. 30, 4, Article 100 (2011), 12 pages. [Part 1].

Ron Maharik, Mikhail Bessmeltsev, Alla Sheffer, Ariel Shamir, and Nathan Carr. 2011. Digital Micrography. ACM Trans. Graph. 30, 4, Article 100 (2011), 12 pages. [Part 2].

Ron Maharik, Mikhail Bessmeltsev, Alla Sheffer, Ariel Shamir, and Nathan Carr. 2011. Digital Micrography. ACM Trans. Graph. 30, 4, Article 100 (2011), 12 pages. [Part 3].

Johannes Meng, Marios Papas, Ralf Habel, Carsten Dachsbacher, Steve Marschner, Markus Gross, and Wojciech Jarosz. 2015. Multiscale Modeling and Rendering of Granular Materials. ACM Trans. Graph. 34, 4, Article 49 (2015), 13 pages.

Thomas Muller, Marios Papas, Markus Gross, Wojciech Jarosz, and Jan Novak. 2016. Efficient Rendering of Heterogeneous Polydisperse Granular Media. ACM Trans. Graph. 35, 6 (2016).

Jonathan Palacios, Lawrence Roy, Prashant Kumar, Chen-Yuan Hsu, Weikai Chen, Chongyang Ma, Li-Yi Wei, and Eugene Zhang. 2017. Tensor Field Design in Volumes. ACM Trans. Graph. 36, 6, Article 188 (2017), 15 pages.

Jonathan Palacios and Eugene Zhang. 2007. Rotational Symmetry Field Design on Surfaces. ACM Trans. Graph. 26, 3, Article 55 (2007).

Adrien Peytavie, Eric Galin, Jérôme Grosjean, and Stéphane Mérillou. 2009. Procedural generation of rock piles using aperiodic tiling. Computer Graphics Forum 28, 7 (2009), 1801-1809.

Charles Purdy. 2019. Make It, Sell It: Repeating Patterns in Adobe Illustrator. (2019). https://create. adobe.com/2019/4/2/make_it_sell_it_repe.html.

Xuejie Qin and Yee-Hong Yang. 2007. Aura 3D Textures. IEEE Transactions on Visualization and Computer Graphics 13, 2 (2007), 379-389.

Bernhard Reinert, Tobias Ritschel, and Hans-Peter Seidel. 2013. Interactive By-example Design of Artistic Packing Layouts. ACM Trans. Graph. 32, 6, Article 218 (2013), 7 pages.

Lincoln Ritter, Wilmot Li, Brian Curless, Maneesh Agrawala, and David Salesin. 2006. Painting with Texture. In EGSR '06. 371-376.

Riccardo Roveri, A. Cengiz Öztireli, Sebastian Martin, Barbara Solenthaler, and Markus Gross. 2015. Example Based Repetitive Structure Synthesis. Comput. Graph. Forum 34, 5 (2015), 39-52.

Chris Rycroft. 2009. Voro++: A three-dimensional Voronoi cell library in C++. (2009). http://math.lbl.gov/voro++/.

K. Sakurai and K. Miyata. 2014. Modelling of Non-Periodic Aggregates Having a Pile Structure. Comput. Graph. Forum 33, 1 (2014), 190-198.

Christian Santoni and Fabio Pellacini. 2016. gTangle: A Grammar for the Procedural Generation of Tangle Patterns. ACM Trans. Graph. 35, 6, Article 182 (2016), 11 pages.

Reza Saputra, Craig Kaplan, and Paul Asente. 2018. RepulsionPak: Deformation-Driven Element Packing with Repulsion Forces. In GI 2018. 10-17.

Reza Adhitya Saputra, Craig S. Kaplan, Paul Asente, and Radomír Me$^{\vee}$ch. 2017. FLOWPAK: Flow-based Ornamental Element Packing. In GI '17. 8-15.

Alexander Schiftner, Mathias Höbinger, Johannes Wallner, and Helmut Pottmann. 2009. Packing Circles and Spheres on Surfaces. ACM Trans. Graph. 28, 5, Article 139 (2009), 8 pages.

D. Schroeder, D. Coffey, and D. Keefe. 2010. Drawing with the Flow: A Sketch-based Interface for Illustrative Visualization of 2D Vector Fields. In SBIM '10. 49-56.

Martin Schwarz, Tobias Isenberg, Katherine Mason, and Sheelagh Carpendale. 2007. Modeling with Rendering Primitives: An Interactive Non-photorealistic Canvas. In NPAR '07. 15-22.

Maria Shugrina, Jingwan Lu, and Stephen Diverdi. 2017. Playful Palette: An Interactive Parametric Color Mixer for Artists. ACM Trans. Graph. 36, 4, Article 61 (2017), 10 pages.

Robert W. Sumner, Johannes Schmid, and Mark Pauly. 2007. Embedded Deformation for Shape Manipulation. ACM Trans. Graph. 26, 3, Article 80 (2007).

Kenshi Takayama, Makoto Okabe, Takashi Ijiri, and Takeo Igarashi. 2008. Lapped Solid Textures: Filling a Model with Anisotropic Textures. ACM Trans. Graph. 27, 3, Article 53 (2008), 9 pages.

VideoLot. 2016. Adobe Illustrator Cs6 | Typography Portrait | Bruno Mars. (2016). https://www.youtube.com/watch?v=_kdhB-8tNeM.

Jun Xing, Rubaiat Habib Kazi, Tovi Grossman, Li-Yi Wei, Jos Stam, and George Fitzmaurice. 2016. Energy-Brushes: Interactive Tools for Illustrating Stylized Elemental Dynamics. In UIST '16. 755-766.

Jie Xu and Craig S. Kaplan. 2007. Calligraphic Packing. In GI '07. 43-50.

Jonas Zehnder, Stelian Coros, and Bernhard Thomaszewski. 2016. Designing Structurally-sound Ornamental Curve Networks. ACM Trans. Graph. 35, 4, Article 99 (2016), 10 pages.

Guo-Xin Zhang, Song-Pei Du, Yu-Kun Lai, Tianyun Ni, and Shi-Min Hu. 2011. Sketch guided solid texturing. Graphical Models 73, 3 (2011), 59-73.

Shizhe Zhou, Changyun Jiang, and Sylvain Lefebvre. 2014. Topology-constrained Synthesis of Vector Patterns. ACM Trans. Graph. 33, 6, Article 215 (2014), 11 pages.

Changqing Zou, Junjie Cao, Warunika Ranaweera, Ibraheem Alhashim, Ping Tan, Alla Sheffer, and Hao Zhang. 2016. Legible Compact Calligrams. ACM Trans. Graph. 35, 4, Article 122 (2016), 12 pages.

\* cited by examiner

GENERATING REPRESENTATIONS TO APPROXIMATE DIGITAL SHAPES USING SAMPLE CIRCLES

BACKGROUND

Recent years have seen significant advancement in hardware and software platforms that utilize digital shapes for various applications. For example, many systems utilize digital shapes for computer graphics or geometry processing applications. In many instances, conventional systems approximate intricate digital shapes using graphics primitives in an effort to reduce the complexity of analyzing and processing the underlying digital shape. Accordingly, these conventional systems can incorporate these complex digital shapes into a desired application using the corresponding approximation.

Despite these advances, however, conventional shape representation systems often suffer from several technological shortcomings that result in inflexible and inefficient operation. For example, conventional shape representation systems are often inflexible in that they rigidly rely on user input to generate approximating representations for digital shapes. In particular, such conventional systems often rely on user input to place and connect the graphics primitives used in generating the representation for a digital shape. Thus, conventional systems typically fail to flexibly generate approximating representations. Further, by relying on user input, conventional systems often fail to flexibly determine the optimal placement and connection of graphics primitives for representing a digital shape.

In addition to flexibility concerns, conventional shape representation systems can also operate inefficiently. For example, as discussed above relying on user input for the placement and connection of graphics primitives may lead to approximating representations for digital shapes that are sub-optimal or inaccurate. Such sub-optimal representations typically require significant amounts of computing resources (e.g., memory, processing power, and processing time) to store and implement the corresponding digital shapes. Some conventional systems may automatically determine the placement and connection of graphics primitives for generating an approximating representation; however, such systems may also utilize a sub-optimal number of graphics primitives to generate an approximating representation. Further, such systems often utilize models or algorithms that are too complex for practical and efficient implementation.

These, along with additional problems and issues, exist with regard to conventional shape representation systems.

SUMMARY

One or more embodiments described herein provide benefits and/or solve one or more of the foregoing or other problems in the art with systems, methods, and non-transitory computer-readable media that accurately and flexibly generate efficient approximating representations for digital shapes utilizing a tunable number of sample circles. In particular, the disclosed systems can approximate a complex digital shape by identifying a set of circles encompassed by the digital shape and/or by generating a set of enclosing circles that surround the shape. For example, in one or more embodiments, the disclosed systems generate a representation for a digital shape based on touching medial/scale axis polar balls. Indeed, the disclosed systems can sample the medial/scale axis polar balls from the digital shape and select a subset in which any two circles overlap no more than a user-selected threshold. Moreover, in some embodiments, the disclosed systems generate a representation for a digital shape using k-means clustering approach with smallest enclosing circles. To illustrate, the disclosed systems can sample a user-specified number of points from the digital shape boundary paths, group the remaining points with the nearest sampled point, and compute the smallest enclosing circle for all points in a group. In this manner, the disclosed systems can flexibly and efficiently generate sample circles that provide an accurate representation of a digital shape and then use the representation for modeling the digital shape in a variety of applications.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
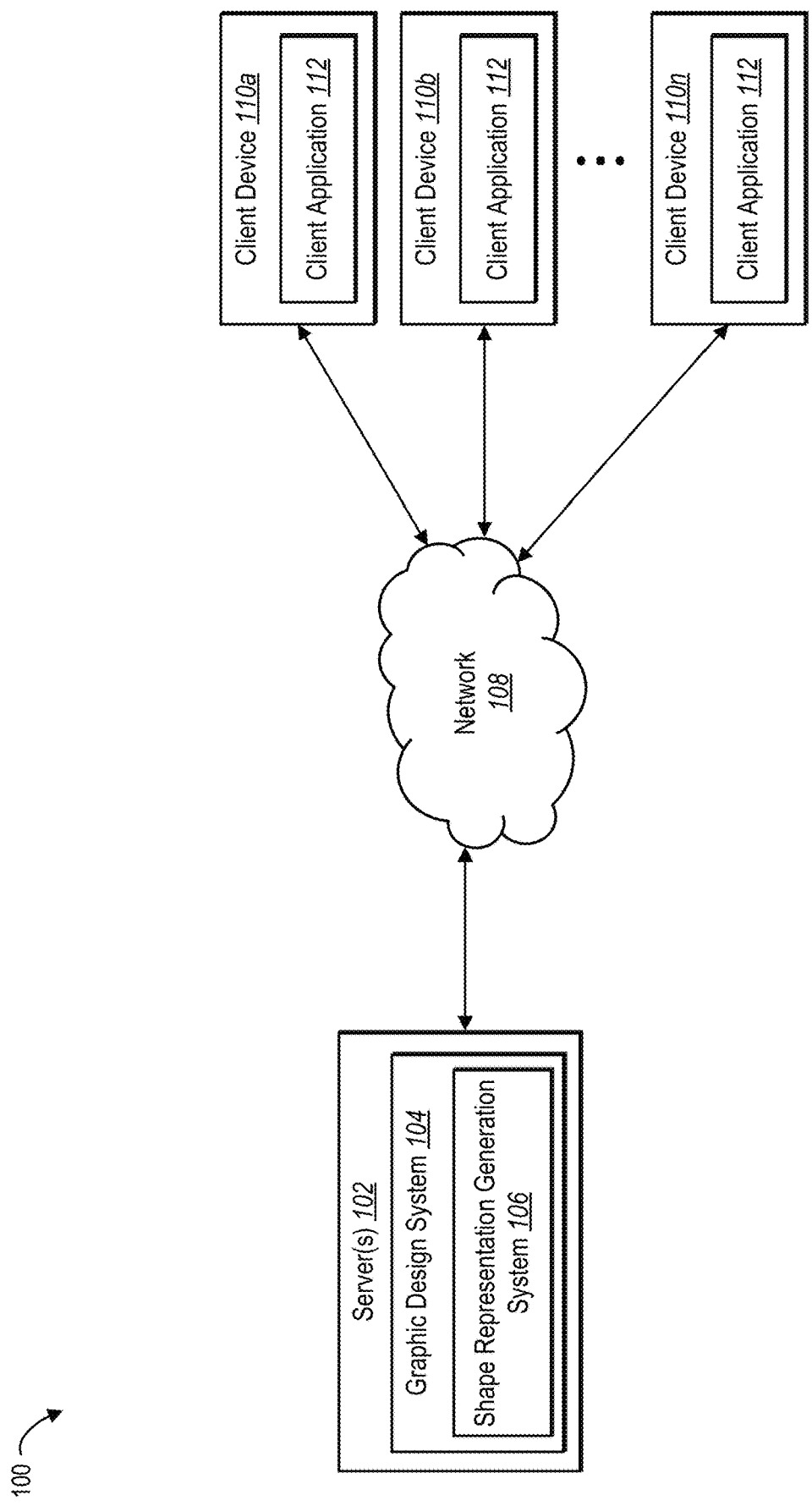
FIG. 1 illustrates an example environment in which a shape representation generation system can operate in accordance with one or more embodiments.

One or more embodiments described herein include a shape representation generation system that accurately and flexibly generates sample circle representations that efficiently approximate digital shapes. Indeed, the shape representation generation system can model a complex digital shape by identifying sample circles encompassed by the digital shape or by identifying sample circles that enclose the digital shape. To illustrate, in one or more embodiments, the shape representation generation system generates a sample circle representation for a digital shape utilizing medial/scale axis polar balls. Indeed, the disclosed systems can select a subset of medial/scale axis polar balls to approximate the digital shape by applying a user-selected overlap threshold. Moreover, in some embodiments, the shape representation generation system utilizes a k-means clustering approach a with smallest enclosing circle algorithm. In particular, the shape representation generation system can generate sample circles that enclose boundary points grouped with a nearest sampled boundary point to generate a sample circle representation for a digital shape. Upon identifying sample circles, in some embodiments, the shape representation generation system also connects the sample circles (e.g., the polar balls or enclosing circles) for a deformable sample circle representation of the digital shape. In this manner, the shape representation generation system can accurately, flexibly, and efficiently generate sample circle representations of digital shapes and then use the sample circle representations in a variety of applications to more efficiently model and revise the digital shapes.

As mentioned above, in one or more embodiments, the shape representation generation system generates a sample circle representation for a digital shape utilizing sample circles corresponding to medial/scale axis polar balls. In particular, the shape representation generation system can determine a medial axis for a digital shape that includes a plurality of digital medial axis points. The shape representation generation system can utilize the plurality of digital medial axis points as center points around which to generate a plurality of sample circles for the digital shape. In particular, the shape representation generation system can generate a plurality of sample circles that are enclosed by the digital shape.

In one or more embodiments, the shape representation generation system selects a subset of the sample circles to generate the sample circle representation of the digital shape. For example, the shape representation generation system can select, for the subset, adjacent sample circles that satisfy an overlap threshold (e.g., overlap no more than the overlap threshold). In one or more embodiments, the shape representation generation system establishes the overlap threshold based on user input or various other factors.

Additionally, as mentioned above, in one or more embodiments, the shape representation generation system generates a sample circle representation for a digital shape using sample circles that enclose groups of points from the digital object. For example, the shape representation generation system can generate one or more groups of boundary points corresponding to sampled boundary points. To illustrate, for a given digital boundary point, the shape representation generation system can identify a nearest sample point (center of a sample ball) and add the given digital boundary point to a group of digital boundary points corresponding to that sample point. The shape representation generation system can further generate one or more sample circles by generating one or more enclosing circles for the one or more groups of digital boundary points. In particular, the shape representation generation system can generate sample circles that encompass the digital shape.

In some embodiments, the shape representation generation system iteratively modifies the one or more enclosing circles to generate one or more modified enclosing circles. For example, the shape representation generation system can iteratively modify the one or more enclosing circles based on proximities of the digital boundary points to center points of the one or more enclosing circles. Thus, the shape representation generation system can generate the sample circle representation for the digital shape utilizing the one or more modified enclosing circles.

In one or more embodiments, the shape representation generation system generates various numbers of enclosing circles and generates the sample circle representation based on the total areas associated with the various numbers of enclosing circles. To illustrate, in one or more embodiments, the shape representation generation system iteratively generates various numbers of enclosing circles that correspond to various numbers of sampled boundary points. The shape representation generation system can generate a sample circle representation for the digital shape based on the number of enclosing circles associated with the smallest total area.

As further mentioned above, in one or more embodiments, the shape representation generation system further generates the sample circle representation by connecting the sample circles generated for the digital shape. For example, in some embodiments, the shape representation generation system connects the sample circles based on a medial axis for the digital shape. In some instances, the shape representation generation system connects the sample circles at the centers of the sample circles (e.g., connects the center of one sample circle to the centers of adjacent sample circles).

The shape representation generation can utilize sample circle representations to model the digital shape in a variety of different applications. In one or more embodiments, the shape representation generation system generates an enhanced graphical object by applying one or more digital shapes to a graphical object using the corresponding sample circle representations. To illustrate, the shape representation generation system can utilize one or more sample circle representations to fill in a graphical object. The shape representation generation system can further utilize sample circle representations to incorporate digital shapes into various other tasks, such as collision handling in physics simulations, progressively rendering levels of detail within an image, shadow computation for global illumination, or various other element distribution tasks for graphic design.

The shape representation generation system provides several advantages over conventional systems. For example, the shape representation generation system can operate more flexibly and accurately than conventional systems. In particular, the shape representation generation system can flexibly generate sample shape representations for digital shapes without reliance on user input of the shape representations, as required by many conventional systems. Further, by selecting sample circles based on an overlap threshold and/or generating enclosing circles based on sampled boundary points, the shape representation generation system can flexibly determine accurate (e.g., near optimal) placement of sample circles, resulting in an accurate and more optimized sample circle representation for a given digital shape.

Additionally, the shape representation generation system can operate more efficiently than conventional systems. In particular, the shape representation generation system utilizes stream-lined models for generating sample circle representations. Indeed, as outlined below, by utilizing computationally efficient medial axis algorithms or enclosing circle algorithms (e.g., smallest enclosing circle algorithms), the shape representation generation system can efficiently generate sample circle representations for digital shapes with little computational overhead. Further, by determining an optimal (or near-optimal) sample circle representation for a given digital shape, the shape representation generation system can more efficiently store and implement the sample circle representation by reducing the amount of required computing resources (e.g., memory, storage, processing power, and processing time).

As illustrated by the foregoing discussion, the present disclosure utilizes a variety of terms to describe features and benefits of the shape representation generation system. Additional detail is now provided regarding the meaning of these terms. For example, as used herein, the term "digital shape" refers to a digital visual element. In particular, a digital shape can refer to a digital visual element defined by a plurality of pixels or vectors to form a shape. For example, a digital shape can include an outline of a digital visual element. A digital shape can refer to a geometric shape (e.g., a diamond, a triangle, a snowflake, etc.) or an organic shape. A digital shape can also refer to a two-dimensional digital visual element or a three-dimensional digital visual element.

In some instances, a digital shape includes one or more boundaries. As used herein, the term "boundary" refers to a limit of an area occupied by a digital shape. In particular, a boundary refers to a border that marks an edge of a digital shape—a border past which the digital shape does not extend. A boundary can include an outer bound of a digital shape. A boundary can also include an inner bound of a digital shape (e.g., a border that runs along an interior hole of the digital shape).

Relatedly, as used herein, the term "digital boundary point" refers to a discretized component of a boundary. In particular, a digital boundary point refers to a digital point (e.g., one or more pixels) that defines or otherwise establishes a portion of a boundary. Indeed, a digital boundary point can include a digital point that, along with other digital boundary points, defines or otherwise establishes a boundary of a digital shape. As used herein, the term "sampled boundary point" refers to a digital boundary point that has been sampled. In one or more embodiments, the shape representation generation system identifies a sampled boundary point using a random, semi-random, or non-random processes for sampling a digital boundary point. As used herein, the term "group of digital boundary points" can refer to a grouping of one or more digital boundary points.

Additionally, as used herein, the term "medial axis" refers to a topological skeleton that corresponds to a digital shape. In particular, a medial axis can refer to a set of points having more than one equidistant, nearest point on the boundary (or boundaries) of a digital shape. For example, a medial axis can include a set of points that are enclosed by a digital shape and that each have at least two equidistant, nearest points on the digital shape boundary (e.g., a circle can be drawn around a point of the medial axis and touch two points on the boundary).

Relatedly, as used herein, the term "digital medial axis point" refers to a discretized component of a medial axis. In particular, a digital medial axis point refers to a digital point that defines or otherwise establishes a discretized portion of a medial axis. Indeed, a digital medial axis point can include a digital point that, along with other digital medial axis points, defines or otherwise establishes a medial axis of a digital shape.

As used herein, the term "sample circle" refers to a graphic primitive representing a portion of a digital shape. For example, a sample circle can include a circle that is enclosed within the one or more boundaries of a digital shape. But a sample circle can also include a circle that encompasses at least a portion of the one or more boundaries of a digital shape as well as at least a portion of the digital shape itself. Additionally, as used herein, the term "center point" (or "center") refers to the center of a sample circle.

Additionally, as used herein, the term "enclosing circle" more specifically refers to a sample circle that encloses at least a portion of the one or more boundaries of a digital shape as well as at least a portion of the digital shape itself. An enclosing circle can refer to a sample circle that only encompasses at least a portion of the one or more boundaries of the digital shape and at least a portion of the digital shape itself. But an enclosing circle can also encompass area external to the digital shape. Relatedly, the term "modified enclosing circle" refers to an enclosing circle that has been modified. For example, a modified enclosing circle can include an enclosing circle having a change in position and/or size. As used herein, the term "smallest enclosing circle" refers to an enclosing circle that encompasses a corresponding portion of a digital shape with an optimal or near-optimal covered area. For example, a smallest enclosing circle can include an enclosing circle that is large enough to encompass a corresponding portion of a digital shape but small enough (or near small enough) to exclude area external to the portion of the digital shape that is unnecessary to include in order to encompass the portion of the digital shape.

Further, as used herein, the term "sample circle representation" refers to an approximation of a digital shape composed of one or more sample circles. For example, a sample circle representation can refer to one or more sample circles that represent a digital shape in its entirety. A sample circle representation can further include connections between the sample circles corresponding to a digital shape.

As used herein, the term "overlap threshold" refers to a threshold indicating an overlap between two sample circles. In particular, an overlap threshold can refer to a maximum degree to which one sample circle can overlap another sample circle (e.g., an adjacent sample circle). For example, an overlap threshold can include a threshold for an overlap as measured by an area or distance of overlap between two sample circles or a percentage by which at least one of the sample circles is overlapped.

Additionally, as used herein, the term "threshold change" refers to a threshold corresponding to a change to one or more sample circles. In particular, a threshold change can refer to a degree to which one or more sample circles change indicating that the one or more sample circles adequately represent or approximate a digital shape. For example, a threshold change can refer to a threshold corresponding to a change in the position of a sample circle or a change in the size of a sample circle.

Further, as used herein, the term "graphical object" refers to a two-dimensional or three-dimensional digital visual object. In particular, a graphical object can refer to a two-dimensional or three-dimensional digital visual object composed of one or more component visual objects. As used herein, the term "enhanced graphical object" refers to a graphical object that is at least partially composed of one or more digital shapes.

Additional detail regarding the shape representation generation system will now be provided with reference to the figures. For example, FIG. 1 illustrates a schematic diagram of an exemplary system environment ("environment") 100 in which a shape representation generation system 106 can be implemented. As illustrated in FIG. 1, the environment 100 includes a server(s) 102, a network 108, and client devices 110*a*-110*n*.

Although the environment 100 of FIG. 1 is depicted as having a particular number of components, the environment 100 can have any number of additional or alternative components (e.g., any number of servers, client devices, or other components in communication with the shape representation generation system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n may be communicatively coupled with each other either directly or indirectly (e.g., through the network 108 discussed in greater detail below in relation to FIG. 10). Moreover, the server(s) 102 and the client devices 110a-110n may include a variety of computing devices (including one or more computing devices as discussed in greater detail with relation to FIG. 10).

As mentioned above, the environment 100 includes the server(s) 102. The server(s) 102 can generate, store, receive, and/or transmit digital data, including sample circle representations of digital shapes. For example, the server(s) 102 can receive a digital shape from a client device (e.g., one of the client devices 110a-110n) and transmit a sample circle representation of the digital shape to another client device. In one or more embodiments, the server(s) 102 comprises a data server. The server(s) 102 can also comprise a communication server or a web-hosting server.

As shown in FIG. 1, the server(s) 102 include a graphic design system 104. In particular, the graphic design system 104 generates, accesses, displays, and/or modifies graphical objects. For example, the graphic design system 104 can generate or otherwise access a two-dimensional graphical object or a three-dimensional graphical object. In one or more embodiments, the graphic design system 104 communicates with a client device (e.g., one of the client devices 110a-110n) for displaying and/or modifying a graphical object. The graphic design system 104 can employ various methods to modify a graphical object or provide various options by which a user of a client device can modify a graphical object.

Additionally, the server(s) 102 includes the shape representation generation system 106. In particular, in one or more embodiments, the shape representation generation system 106 utilizes the server(s) 102 to generate sample circle representations for digital shapes. For example, the shape representation generation system 106 can utilize the server(s) 102 to identify a digital shape and generate a sample circle representation for the digital shape.

To illustrate, in one or more embodiments, the shape representation generation system 106, via the server(s) 102, determines a medial axis for a digital shape and generates a sample circle representation using sample circles generated based on the medial axis. In some embodiments, via the server(s) 102, the shape representation generation system 106 samples one or more boundary points of a digital shape and generates a sample circle representation by generating enclosing circles for digital boundary points grouped based on the one or more sampled boundary points. In some instances, the shape representation generation system 106, via the server(s) 102, generates the sample circle representation by further connecting the sample circles to generate a deformable or rigid sample circle representation.

In one or more embodiments, the client devices 110a-110n include computing devices that can access and/or modify digital shapes and/or graphical objects. For example, the client devices 110a-110n can include smartphones, tablets, desktop computers, laptop computers, head-mounted-display devices, or other electronic devices. The client devices 110a-110n include one or more applications (e.g., the client application 112) that can access and/or modify digital shapes and/or graphical objects. For example, the client application 112 includes a software application installed on the client devices 110a-110n. Additionally, or alternatively, the client application 112 includes a software application hosted on the server(s) 102, which may be accessed by the client devices 110a-110n through another application, such as a web browser.

The shape representation generation system 106 can be implemented in whole, or in part, by the individual elements of the environment 100. Indeed, although FIG. 1 illustrates the shape representation generation system 106 implemented with regard to the server(s) 102, different components of the shape representation generation system 106 can be implemented by a variety of devices within the environment 100. For example, one or more (or all) components of the shape representation generation system 106 can be implemented by a different computing device (e.g., one of the client devices 110a-110n) or a separate server from the server(s) 102 hosting the graphic design system 104. Example components of the shape representation generation system 106 will be described below with regard to FIG. 7.

Figure 2:
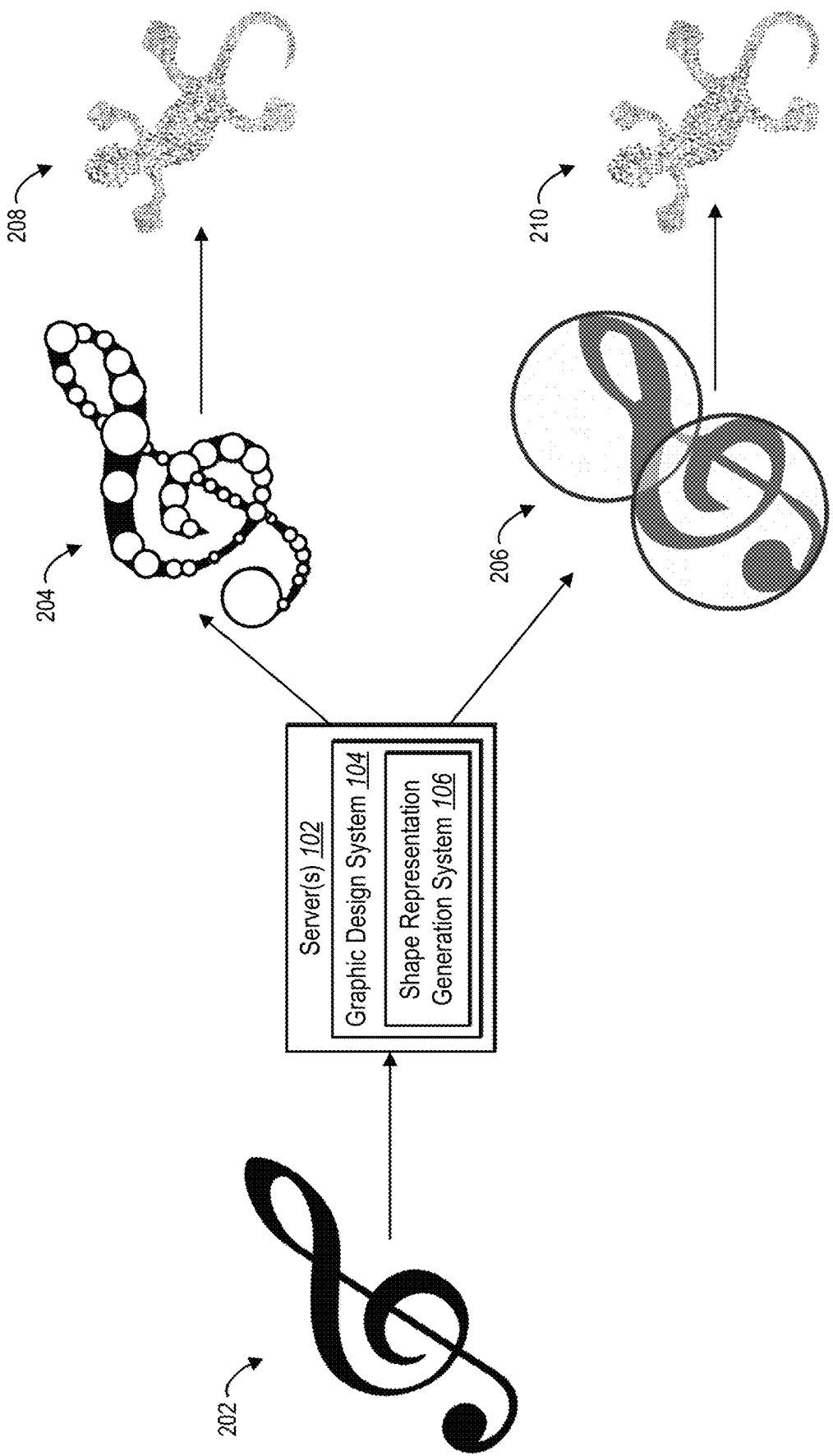
FIG. 2 illustrates a block diagram of the shape representation generation system generating a sample circle representation for a digital shape in accordance with one or more embodiments.

As mentioned above, the shape representation generation system 106 can generate a sample circle representation for a digital shape. FIG. 2 illustrates a block diagram of the shape representation generation system 106 generating a sample circle representation for a digital shape in accordance with one or more embodiments.

As shown in FIG. 2, the shape representation generation system 106 identifies a digital shape 202. In one or more embodiments, the shape representation generation system 106 identifies the digital shape 202 by receiving the digital shape 202 from a computing device (e.g., a third-party server or a client device). In some embodiments, however, the shape representation generation system 106 identifies the digital shape 202 by accessing a database storing digital shapes. For example, the shape representation generation system 106 can maintain a database and store a plurality of digital shapes therein. In some instances, an external device or system stores digital shapes for access by the shape representation generation system 106.

As illustrated in FIG. 2, the shape representation generation system 106 generates a sample circle representation for the digital shape 202. In particular, in one or more embodiments, the shape representation generation system 106 generates the sample circle representation 204. As shown, the sample circle representation 204 includes a plurality of sample circles enclosed by the digital shape 202. More detail regarding generating a sample circle representation that includes a plurality of sample circles enclosed by a digital shape will be discussed in more detail below with regard to FIGS. 3A-3G. In some embodiments, the shape representation generation system 106 generates the sample circle representation 206. As shown, the sample circle representation 206 includes a plurality sample circles that encompass the digital shape 202. More detail regarding generating a sample circle representation that includes one or more sample circles that encompass a digital shape will be discussed in more detail below with regard to FIGS. 4A-4G.

In one or more embodiments, the shape representation generation system 106 can generate the sample circle representation 204 or the sample circle representation 206 based on user input. Indeed, the shape representation generation system 106 can receive a user selection that indicates a type of sample circle representation desired. Accordingly, the shape representation generation system 106 can generate a sample circle representation for a digital shape that corresponds to the user-selected type of sample circle representation.

The shape representation generation system 106 can utilize the sample circle representation 204 or the sample circle representation 206 to perform one or more various tasks. For example, as shown in FIG. 2, the shape representation generation system 106 can utilize the sample circle representation 204 to generate the enhanced graphical object 208 or similarly use the sample circle representation 206 to generate the enhanced graphical object 210. Indeed, the shape representation generation system 106 can utilize a sample circle representation to apply a corresponding digital shape to a graphical object to generate an enhanced graphical object as will be discussed in more detail below with reference to FIG. 6. The shape representation generation system 106 can further utilize sample circle representations to incorporate digital shapes into various other tasks, such as collision handling in physics simulations, progressively rendering levels of detail within an image, shadow computation for global illumination, or various other element distribution tasks for graphic design.

As mentioned above, the shape representation generation system 106 can generate a sample circle representation for a digital shape that includes a plurality of sample circles enclosed by the digital shape. FIGS. 3A-3G illustrate diagrams for generating a sample circle representation that includes a plurality of sample circles enclosed by a digital shape in accordance with one or more embodiments.

Figure 3C:
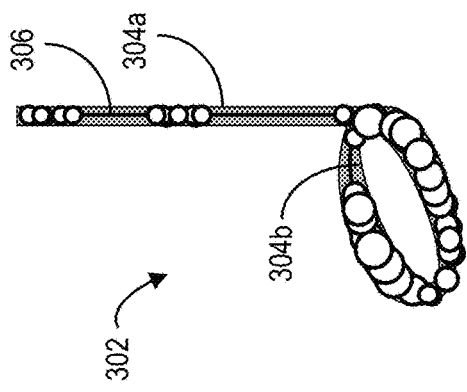
FIGS. 3A-3G illustrate diagrams for generating a sample circle representation that includes a plurality of sample circles enclosed by a digital shape in accordance with one or more embodiments.
Figure 3B:
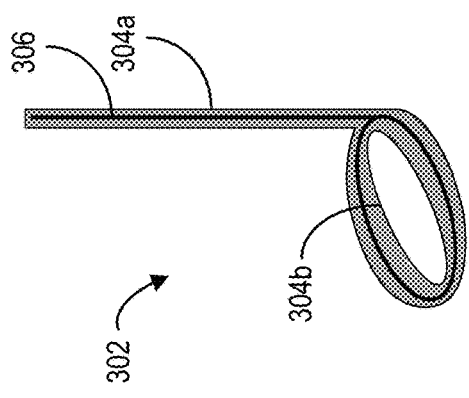
Figure 3D:
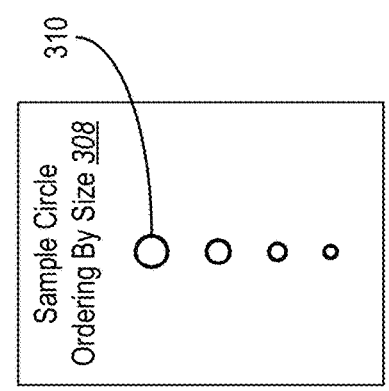
Figure 3A:
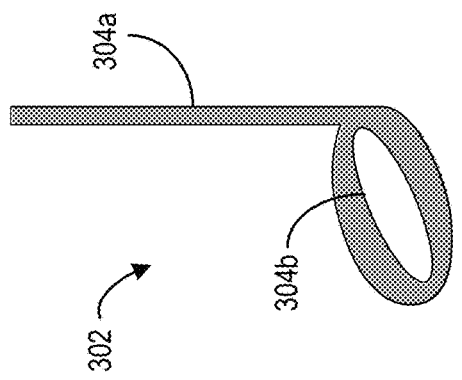

As shown in FIG. 3A, the shape representation generation system 106 identifies the digital shape 302. For example, the shape representation generation system 106 can identify the digital shape 302 as discussed above with reference to FIG. 2. As illustrated in FIG. 3A, the digital shape 302 includes the boundaries 304a-304b (e.g., an external boundary 304a and an internal boundary 304b). In one or more embodiments, the boundaries 304a-304b are defined by a plurality of digital boundary points.

As shown in FIG. 3B, the shape representation generation system 106 determines a medial axis 306 for the digital shape 302. In one or more embodiments, the shape representation generation system 106 determines the medial axis 306 for the digital shape 302 based on the plurality of digital boundary points that define the boundaries 304a-304b of the digital shape 302. For example, the shape representation generation system 106 can apply the plurality of digital boundary points to a medial axis model or medial axis algorithm that determines the medial axis 306 for the digital shape 302. In one or more embodiments, the medial axis 306 is defined by a plurality of digital medial axis points.

As shown in FIG. 3C, the shape representation generation system 106 generates a plurality of sample circles for the digital shape 302. In particular, the shape representation generation system 106 can generate the plurality of sample circles based on the plurality of digital medial axis points that define the medial axis 306 of the digital shape. For example, the shape representation generation system 106 can generate a sample circle centered around a corresponding digital medial axis point. In one or more embodiments, the shape representation generation system 106 generates a sample circle for each digital medial axis point that contributes to the medial axis 306 of the digital shape.

In one or more embodiments, the shape representation generation system 106 generates a given sample circle having a radius large enough so that the given sample circle touches at least one of the boundaries 304a-304b of the digital shape 302. For example, the shape representation generation system 106 can generate a given sample circle having a radius just large enough so that the given sample circle touches the closest digital boundary points of the boundaries 304a-304b. Thus, the shape representation generation system 106 can generate the plurality of sample circles to have various sizes and locations based on the locations of the corresponding digital medial axis points. Further, the shape representation generation system 106 can generate the plurality of sample circles by generating sample circles enclosed by the boundaries 304a-304b of the digital shape 302 (e.g., enclosed by the plurality of digital boundary points of the digital shape 302).

Though FIGS. 3B-3C illustrate the shape representation generation system 106 determining the medial axis 306 and generating the plurality of sample circles based on the medial axis 306, it should be noted that the shape representation generation system 106 can generate the plurality of sample circles before or at the same time as determining the medial axis 306. In one or more embodiments, the shape representation generation system 106 determines the medial axis for a digital shape and/or generates the plurality of sample circles as described in Nina Amenta et al., *The Power Crust*, in SMA '01, 249-266, 2011, which is incorporated herein by reference in its entirety. In some embodiments, the shape representation generation system 106 determines the medial axis for a digital shape and/or generates the plurality of sample circles as described in Floris Steenkamp, *Medial (and Scale) Axis Transform Library—SVG Focused*, 2019, https://github.com/FlorisSteenkamp/MAT, which is incorporated herein by reference in its entirety.

As shown in FIG. 3D, the shape representation generation system 106 determines an ordering of the sample circles based on size (as shown by the box 308). Indeed, the shape representation generation system 106 can determine a size (e.g., radius, circumference, etc.) of each sample circle and determine an ordering of the sample circles accordingly. For example, as illustrated, the shape representation generation system 106 can rank/sort the sample circles from largest to smallest.

Figure 3G:
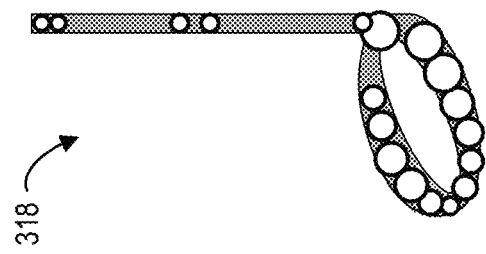
Figure 3F:
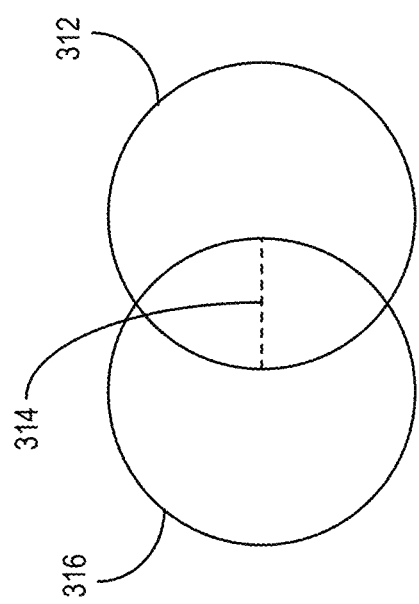
Figure 3E:
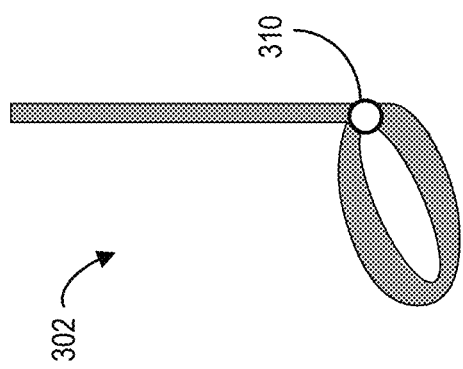

As illustrated in FIG. 3E, the shape representation generation system 106 can select a subset of sample circles from the plurality of sample circles to generate a sample circle representation of the digital shape 302. In particular, the shape representation generation system 106 can select the subset of sample circles based on the ordering of sample circles. For example, in one or more embodiments, the shape representation generation system 106 begins selecting from the plurality of sample circles by selecting the largest sample circle (e.g., the sample circle 310). The shape representation generation system 106 can progress through the ordering of sample circles, selecting each sample circle in sequence and determining whether or not to add the sample circle to the subset of sample circles to be used for the sample circle representation for the digital shape 302.

As shown in FIG. 3F, the shape representation generation system 106 can determine whether or not to add a sample circle 312 to the subset of sample circles used for the sample circle representation for the digital shape 302 based on an overlap 314 of the sample circle 312 with another sample circle 316 that was previously added to the subset of sample circles. Indeed, the shape representation generation system 106 can determine an overlap between the sample circle 312 and the other sample circle 316. In one or more embodiments, the shape representation generation system 106 determines the overlap 314 as a distance (as indicated in FIG. 3F). For example, the shape representation generation system 106 can determine the overlap 314 as the distance at the highest point of overlap between the sample circle 312 and the other sample circle 316 or as the distance at some other point of overlap. In some embodiments, the shape representation generation system 106 determines the overlap 314 as an area covered by an overlapping region associated with the sample circle 312 and the other sample circle 316. In some instances, the shape representation generation system 106 determines the overlap 314 as a percentage by which the sample circle 312 and/or the other sample circle 316 are overlapped. In one or more embodiments, the shape representation generation system 106 determines an overlap between the sample circle 312 and all other sample circles previously added to the subset of sample circles to determine whether to add the sample circle 312 to the subset of sample circles.

The shape representation generation system 106 can further determine whether the sample circle 312 and the other sample circle 316 satisfy an overlap threshold based on the determined overlap (e.g., whether the sample circle 312 and the other sample circle 316 overlap no more than the overlap threshold).

In one or more embodiments, the shape representation generation system 106 determines the overlap threshold based on user input. For example, the shape representation generation system 106 can receive user input from a client device indicating a desired overlap threshold. In some embodiments, the shape representation generation system 106 determines the overlap threshold using a pre-determined value (e.g., a default value or fixed value). In some instances, the shape representation generation system 106 determines the overlap threshold based on a number of sample circles to be used to represent the corresponding digital shape. To illustrate, the shape representation generation system 106 can determine (e.g., based on user input or a default or fixed value) that a high number of sample circles are to be used in representing the digital shape (e.g., larger than a minimum amount of sample circles necessary to represent the digital shape). In such a case, the shape representation generation system 106 can establish a larger overlap threshold to ensure that the correct number of sample circles are utilized in representing the digital shape. Moreover, in some instances, the shape representation generation system 106 can determine the overlap threshold based on a measure of the complexity of digital shape (e.g., establishing a larger overlap threshold for more complex digital shapes—such as those with one or more interior holes—in order to ensure an adequate representation of the digital shape).

In one or more embodiments, based on determining that the sample circle 312 and the other sample circle 316 satisfy the overlap threshold, the shape representation generation system 106 adds the sample circle 312 to the subset of sample circles used for the sample circle representation for the digital shape 302. Further, based on determining that the sample circle 312 and the other sample circle 316 fail to satisfy the overlap threshold (i.e., overlap more than the overlap threshold), the shape representation generation system 106 excludes the sample circle 312 from the subset of sample circles. Thus, the shape representation generation system 106 utilizes the overlap threshold to select a subset of sample circles to use for the sample circle representation. The shape representation generation system 106 can iteratively progress through the ordering of sample circles, apply the overlap threshold, and select additional sample circles to include in the shape representation. By selecting the subset of sample circles beginning with the largest sample circle and progressing toward the smallest sample circle, the shape representation generation system 106 can select those sample circles that are most representative of the corresponding digital shape (e.g., the largest circles that do not overlap beyond a threshold).

Thus, as shown in FIG. 3G, the shape representation generation system 106 generates a sample circle representation 318 of the digital shape 302. Though FIG. 3G shows the digital shape 302 as part of the sample circle representation 318, it should be noted that this is merely an illustration. Indeed, the shape representation generation system 106 can utilize the selected subset of sample circles as the sample circle representation 318. As illustrated in FIG. 3G, however, the sample circle representation 318 for the digital shape 302 includes a plurality of sample circles enclosed by the digital shape 302 (i.e., enclosed by the boundaries 304a-304b of the digital shape 302).

In one or more embodiments, the shape representation generation system 106 stores the sample circle representation 318 for later use. In some embodiments, however, the shape representation generation system 106 can apply the sample circle representation 318 as needed.

The algorithm presented below is another characterization of how the shape representation generation system 106 generates a sample circle representation for a digital shape using a plurality of sample circles enclosed by the digital shape in accordance with one or more embodiments.

Algorithm 1

```
ξ ← user specified spacing ratio ∈ [0, ∞)
compute MAT/SAT T of a given element e // [1, 5]
sample set S ← ∅
for each polar ball b ∈ T in decreasing radius do
    include ← true
    for each b' ∈ S do
        if ‖b_center − b'_center‖ < ξ(b_radius + b'_radius) then
            include ← false
        end
        if include then
            S ← S + b
        end
    end
end
return S
```

In Algorithm 1 shown above, the user specified spacing ratio (represented by ξ) refers to an overlap threshold determined based on user input. Further, the MAT/SAT T refers to the Medial (or Scale) Axis Transform of a digital shape (represented as the element e), referring to the medial axis corresponding to the digital shape as well as the sample circles associated with the digital medial axis points. A polar ball (represented as b) refers to a sample circle generated based on a corresponding digital medial axis point. Thus, $b_{center}$ represents the center of a sample circle b (or a location of the center within some coordinate scheme) and $b_{radius}$ represents a radius of the sample circle b. The sample set S refers to the subset of sample circles selected for the sample circle representation of the digital shape.

As mentioned previously, the shape representation generation system 106 can operate more flexibly than conventional systems. Indeed, by generating a plurality of sample circles based on a medial axis that corresponds to a digital shape and selecting a subset of those sample circles for use in the sample circle representation, the shape representation generation system 106 can flexibly generate sample circle representations without relying on user input. Further, by selecting the subset of sample circles based on an overlap threshold, the shape representation generation system 106 can flexibly determine an optimal (or near-optimal) placement of the sample circles. Additionally, the shape representation generation system 106 is more practical. Indeed, the shape representation generation system 106 can efficiently generate sample circle representations that require less memory resources for storage and less processing resources for implementation.

As mentioned above, the shape representation generation system 106 can generate a sample circle representation that includes a one or more sample circles that encompass the digital shape. FIGS. 4A-4G illustrate diagrams for generating a sample circle representation that includes a one or more sample circles that encompass a digital shape in accordance with one or more embodiments.

Figure 4B:
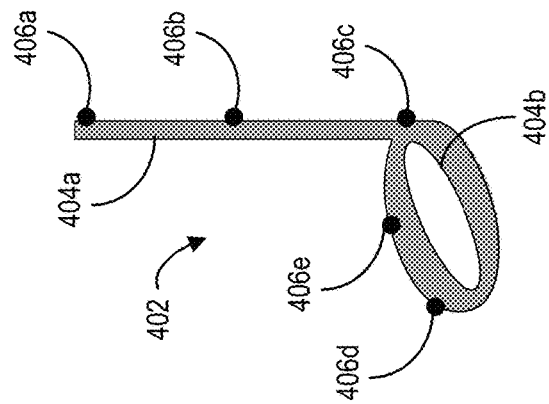
FIGS. 4A-4G illustrate diagrams for generating a sample circle representation that includes a one or more sample circles that encompass a digital shape in accordance with one or more embodiments.
Figure 4D:
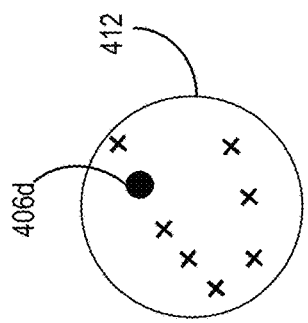
Figure 4A:
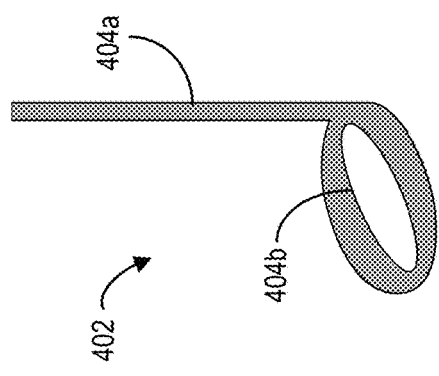

As shown in FIG. 4A, the shape representation generation system 106 identifies the digital shape 402. For example, the shape representation generation system 106 can identify the digital shape 402 as discussed above with reference to FIG. 2. As illustrated in FIG. 4A, the digital shape 402 includes the boundaries 404a-404b (e.g., the external boundary 404a and the internal boundary 404b). In one or more embodiments, the boundaries 404a-404b are defined a plurality of digital boundary points.

As shown in FIG. 4B, the shape representation generation system 106 samples the digital boundary points that define the boundaries 404a-404b of the digital shape 402. In particular, the shape representation generation system 106 106 samples the digital boundary points to determine the sampled boundary points 406a-406e. Though FIG. 4B illustrates a particular number of sampled boundary points, the shape representation generation system 106 can more broadly sample various numbers of digital boundary points. In other words, the shape representation generation system 106 can sample one or more digital boundary points to determine one or more sampled boundary points. Further, though FIG. 4B only illustrates sampled boundary points associated with the outer boundary of the digital shape 402 (i.e., the boundary 404a), the shape representation generation system 106 can also sample from inner boundaries of digital shapes (e.g., the internal boundary 404b). In other words, the shape representation generation system 106 can sample digital boundary points associated with the interior hole of the digital shape 402 (i.e., the internal boundary 404b).

In some embodiments, the shape representation generation system 106 samples points from any location falling within an external boundary of a digital shape. For example, the shape representation generation system 106 can sample points from any location within the external boundary 404a. Thus, for example, the shape representation generation system 106 can sample points between the external boundary 404a and the internal boundary 404b or the interior hole bounded by the interior boundary 404b.

In one or more embodiments, the shape representation generation system 106 determines the number of samples (i.e., determines the number of digital boundary points to sample) based on user input. For example, the shape representation generation system 106 can receive user input from a client device indicating a desired number of samples. The shape representation generation system 106 can sampled the digital boundary points based on the number of samples. In some embodiments, the shape representation generation system 106 determines the number of digital boundary points to sample using a pre-determined value (e.g., a default value or fixed value). In some instances, the shape representation generation system 106 can determine the number of digital boundary points to sample based on a size of the digital shape. For example, the shape representation generation system 106 can determine to utilize a greater number of samples for a larger digital shape than would be used for a smaller digital shape. Moreover, in some embodiments, the shape representation generation system 106 determines a number of digital boundary points to sample based on the complexity of the digital shape (e.g., sampling more digital boundary points for more complex digital shapes—such as those with one or more interior holes—in order to ensure an adequate representation of the digital shape).

Figure 4C:
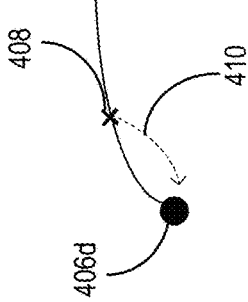

In one or more embodiments, the shape representation generation system 106 generates groups of digital boundary points corresponding to the sampled boundary points. In particular, the shape representation generation system 106 can generate the groups of digital boundary points by associating unsampled digital boundary points with the nearest sampled boundary point. For example, as shown in FIG. 4C, for the digital boundary point 408, the shape representation generation system 106 can identify the sampled boundary point 406d as the nearest sampled boundary point to the digital boundary point 408. Based on identifying the sampled boundary point 406d as the nearest sampled boundary point to the digital boundary point 408, the shape representation generation system 106 can add the digital boundary point 408 to a group of digital boundary points corresponding to the sampled boundary point 406d (as indicated by the dashed line 410). In one or more embodiments, the shape representation generation system 106 adds each of the remaining unsampled digital boundary points to a group of digital boundary points that corresponds to a nearest sampled boundary point.

As shown in FIG. 4D, the shape representation generation system 106 generates an enclosing circle 412 for the group of digital boundary points corresponding to the sampled boundary point 406d. In particular, as shown in FIG. 4D, the enclosing circle 412 encompasses the group of digital boundary points. Further, as shown in FIG. 4D, the enclosing circle 412 is not centered around the sampled boundary point 406d; rather, the shape representation generation system 106 generates the enclosing circle 412 having a center based on the group of digital boundary points encompassed therein. In particular, the shape representation generation system 106 centers the enclosing circle 412 based on a central point associated with the group of digital boundary points. In some embodiments, the shape representation generation system 106 generates enclosing circles that do center around their corresponding sampled boundary point.

In one or more embodiments, the shape representation generation system 106 generates the enclosing circle 412 by generating a smallest enclosing circle. Indeed, the shape representation generation system 106 generate the enclosing circle 412 to cover the smallest area possible while encompassing the group of digital boundary points corresponding to the sampled boundary point 406d. In one or more embodiments, the shape representation generation system 106 generates a smallest enclosing circle for a group of digital boundary points as described by *Smallest Enclosing Circle*, Project Nayuki, 2018, https://www.nayuki.io/page/smallest-enclosing-circle, which is incorporated herein by reference in its entirety.

Figure 4G:
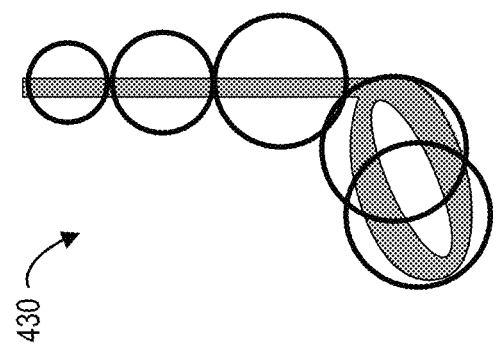
Figure 4F:
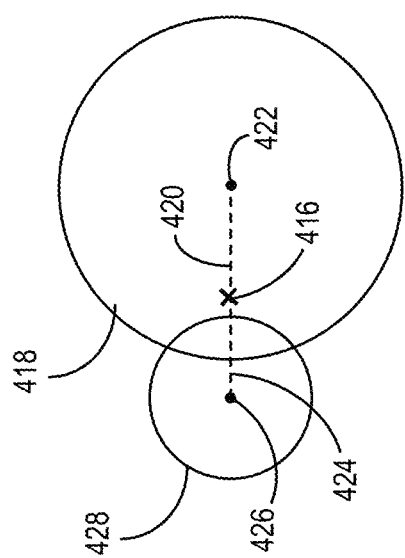
Figure 4E:
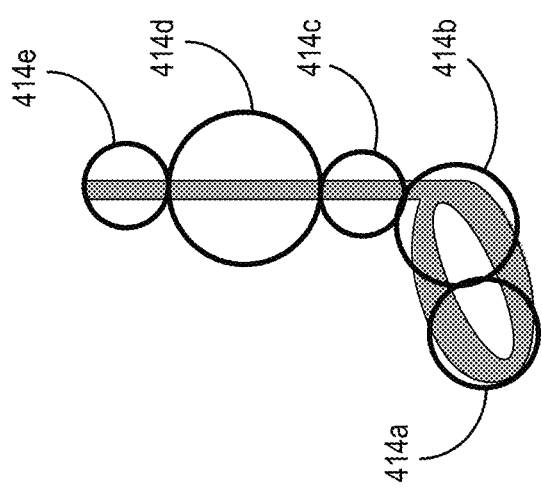

As illustrated in FIG. 4E, the shape representation generation system 106 generates a plurality of enclosing circles 414a-414e. In particular, the shape representation generation system 106 can generate an enclosing circle for each group of digital boundary points corresponding to a sampled boundary point. Though FIG. 4E illustrates a particular number of enclosing circles, the shape representation generation system 106 can generate more or fewer enclosing circles based on the number of groups of digital boundary points (i.e., the number of digital boundary points sampled).

In one or more embodiments, the shape representation generation system 106 further modifies the enclosing circles 414a-414e based on proximities of the plurality of digital boundary points to center points of the enclosing circles 414a-414e to generate modified enclosing circles. To illustrate, as shown in FIG. 4F, the shape representation generation system 106 identifies the digital boundary point 416 associated with the enclosing circle 418. The shape representation generation system 106 can further determine a distance 420 between the digital boundary point 416 and a center point 422 of the enclosing circle 418. The shape representation generation system 106 can also determine a distance 424 between the digital boundary point 416 and a center point 426 of another enclosing circle 428.

In one or more embodiments, the shape representation generation system 106 determines that the distances 420 is greater than the distance 424. Accordingly, the shape representation generation system 106 can add the digital boundary point 416 to the group of digital boundary points corresponding to the enclosing circle 428. Thus, the shape representation generation system 106 can modify the groups of digital boundary points based on how close each digital boundary point is to the center point of each enclosing circle. The shape representation generation system 106 can further modify the enclosing circles 418, 428 to enclose the modified groups of digital boundary point, thus generating modified enclosing circles. In one or more embodiments, by modifying the enclosing circles 418, 428, the shape representation generation system 106 can modify the location and/or size of the enclosing circles 418, 428 based on the digital boundary points encompassed therein.

In one or more embodiments, the shape representation generation system 106 iteratively modifies the enclosing circles generated for a digital shape based on the proximities of the digital boundary points to center points of the enclosing circles. Indeed, with each iteration, the shape representation generation system 106 can add one or more digital boundary points to a group of digital boundary points corresponding to a different enclosing circle and then modify the enclosing circles accordingly. In one or more embodiments, the shape representation generation system 106 determines a maximum number of iterations (e.g., based on user input, using a default or fixed value, or based on a size or complexity of the digital shape). Accordingly, the shape representation generation system 106 can iteratively modify the enclosing circles based on the maximum number of iterations (e.g., until the maximum number of iterations has been reached). In some embodiments, the shape representation generation system 106 determines a threshold change applied to the enclosing circles (e.g., a threshold in a change of radius). Accordingly, the shape representation generation system 106 can iteratively modify the enclosing circles until at least one of the enclosing circles changes less than the threshold change.

Thus, as shown in FIG. 4G, the shape representation generation system 106 generates a sample circle representation 430 of the digital shape 402. Though FIG. 4G shows the digital shape as part of the sample circle representation 430, it should be noted that this is merely an illustration. Indeed, the shape representation generation system 106 can utilize the enclosing circles as the sample circle representation 430. As illustrated in FIG. 4G, however, the sample circle representation 430 includes a plurality of enclosing circles that encompass the digital shape 402.

In one or more embodiments, the shape representation generation system 106 stores the sample circle representation 430 for later use. In some embodiments, however, the shape representation generation system 106 can apply the sample circle representation 430 as needed.

The algorithm presented below is another characterization of how the shape representation generation system 106 generates a sample circle representation for a digital shape using a plurality of enclosing circles that encompass the digital shape in accordance with one or more embodiments.

---
Algorithm 2
---
P(e) ← uniform point sets from a given element e
B ← user-specified number of samples for e
sample set S ← random B centers from P(e) with 0 radii
while not enough iterations do
    //compute nearest ball center for each point
    for each b ∈ S do
        P(b) ← ∅
    end
    for each p ∈ P(e) do
        b' = $\text{argmin}_b \|p - b_{center}\|$, ∀b ∈ S
        P(b') ← P(b') + p
    end
    //compute smallest enclosing circles
    for each b ∈ S do
        b ← SmallestEnclosingCircle(P(b))
    end
end
return S
---

In Algorithm 2 shown above, the uniform point sets (represented by P(e)) refers to the set of digital boundary points of a digital shape (represented as the element e), and p represents a digital boundary point from P(e). Further, the user-specified number of samples (represented by B) refers to a number of digital boundary points to be sampled based on some user input. The sample set S refers to a set of digital boundary points sampled from the digital boundary points of the digital shape and b refers to a sampled boundary point from the set S. P(b) represents a group of digital boundary points corresponding to the sampled boundary point b, and $b_{center}$ represents the center (or center point) of the sampled boundary point b. Additionally, SmallestEnclosingCircle (P(b)) represents a smallest enclosing circle generated for the group of digital boundary points P(b).

In one or more embodiments, the shape representation generation system 106 generates the one or more enclosing circles using a modified k-means clustering model. In particular, the shape representation generation system 106 can modify a k-means clustering model to compute the mean of a group of digital boundary points using an enclosing circle (e.g., a smallest enclosing circle) rather than using the average of all the digital boundary points within the group of digital boundary points.

In one or more embodiments, the shape representation generation system 106 generates various numbers of enclosing circles for a digital shape and utilizes one of the numbers of enclosing circles to generate the sample circle representation for the digital shape. Indeed, the shape representation generation system 106 can sample various numbers of digital boundary points of a digital shape and generate various numbers of enclosing circles for digital boundary groups corresponding to various numbers of sampled boundary points. The shape representation generation system 106 can further iteratively modify the enclosing circles to generate various numbers of modified enclosing circles.

For example, the shape representation generation system 106 can apply Algorithm 2 with five enclosing circles to generate a first sample circle representation. The shape representation generation system 106 can then apply Algorithm 2 with ten enclosing circles to generate a second sample circle representation. The representation generation system 106 can select between the first sample circle representation and the second sample circle representation. Specifically, the representation generation system 106 can compare the area covered by the five enclosing circles (from the first sample circle representation) with the area covered by the ten enclosing circles (from the second sample circle representation). Indeed, in some embodiments, the sample circle representation with the smallest cumulative area covered by the enclosing circles is chosen as the final sample circle representation.

In one or more embodiments, the shape representation generation system 106 determines a range of numbers of enclosing circles to generate for a digital shape (e.g., 1 through 10). The shape representation generation system 106 can select a number of enclosing circles from the range to utilize in generating the sample circle representation for the digital shape. In one or more embodiments, the shape representation generation system 106 determines a maximum number of enclosing circles to generate for a digital shape. The shape representation generation system 106 can generate numbers of enclosing circles up to the maximum number of enclosing circles (e.g., from one enclosing circle to the maximum number of enclosing circles). In one or more embodiments, the shape representation generation system 106 determines the range of numbers of enclosing circles or the maximum number of enclosing circles based on user input.

As mentioned, in one or more embodiments, the shape representation generation system 106 utilizes the number of enclosing circles corresponding to the minimum total area covered by the enclosing circles. For example, the shape representation generation system 106 can generate different sample circle representations for different numbers of enclosing circles within the range of numbers of enclosing circles or up to the maximum number of enclosing circles and select the number of enclosing circles that covers the least amount of total area.

In some embodiments, the shape representation generation system 106 generates sample circle representations for different numbers of enclosing circles within the range of numbers of enclosing circles or progressing up to the maximum number of enclosing circles until the shape representation generation system 106 determines an increase in the total area covered by the number of enclosing circles (e.g., an increase beyond a threshold). For example, consider a circumstance where the shape representation generation system 106 applies Algorithm 2 with seven enclosing circles to determine a first area, and then applies Algorithm 2 with eight enclosing circles to determine a second area. In some embodiments, if the second area is greater than the first area, the shape representation generation system 106 can stop generating additional sample circle representations (e.g., the shape representation generation system 106 will not progress to apply Algorithm 2 with nine enclosing circles). Rather, the shape representation generation system 106 can utilize the number of enclosing circles before the increase in total area to generate the sample circle representation for the digital shape.

Thus, the shape representation generation system 106 can operate more flexibly than conventional systems. Indeed, by generating one or more enclosing circles based on sampled boundary points of a digital shape, the shape representation generation system 106 can flexibly generate sample circle representations without relying on user input. Further, by iteratively modifying the enclosing circles, the shape representation generation system 106 can flexibly determine an optimal (or near-optimal) placement and size of the sample circles. Additionally, the shape representation generation system 106 is more practical. Indeed, the shape representation generation system 106 can more efficiently generate sample circle representations that that require less memory resources for storage and less processing resources for implementation.

Figure 5B:
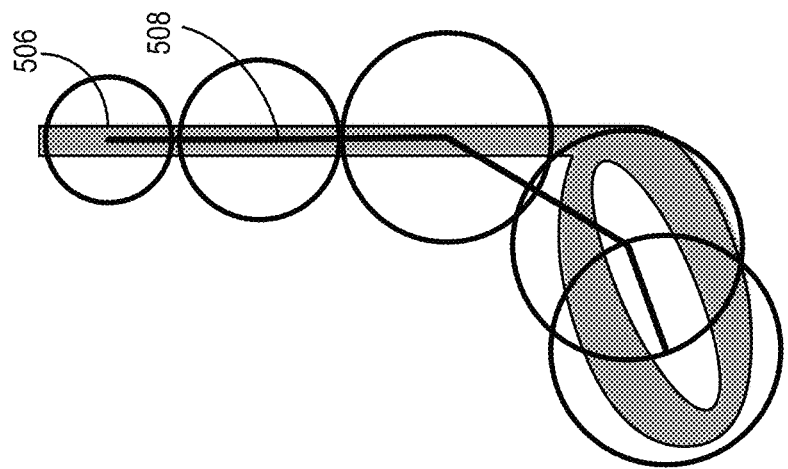
FIGS. 5A-5B illustrate diagrams for connecting sample circles generated for a digital shape in accordance with one or more embodiments.
Figure 5A:
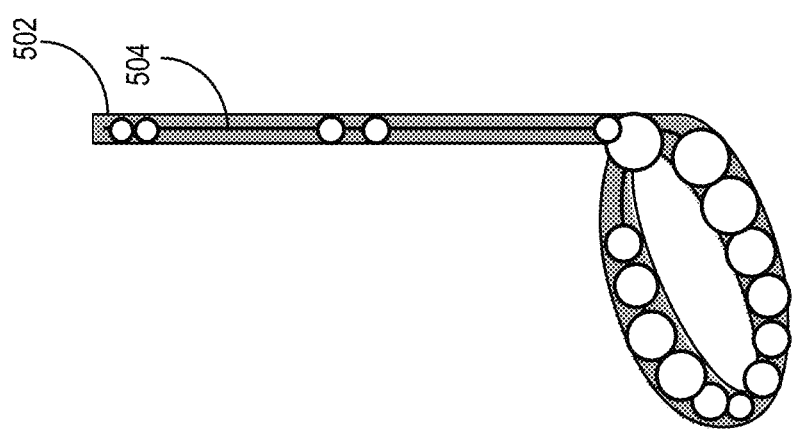

As mentioned above, the shape representation generation system 106 can generate a sample circle representation for a digital shape by further connecting the sample circles generated for the digital shape. FIGS. 5A-5B illustrate diagrams for connecting sample circles generated for a digital shape in accordance with one or more embodiments. As shown in FIG. 5A, the shape representation generation system 106 connects the plurality of sample circles generated for the digital shape 502 using a medial axis 504 determined for the digital shape 502. In one or more embodiments, the shape representation generation system 106 can flexibly deform the resulting sample circle representation as will be discussed in more detail below with reference to FIG. 6 As shown in FIG. 5B, the shape representation generation system 106 connects the sample circles generated for the digital shape 506 by connecting the centers of the sample circles (as indicated by the line 508). In one or more embodiments, the shape representation generation system 106 can apply rigid deformations to the resulting sample circle representation as will be discussed in more detail below with reference to FIG. 6.

In one or more embodiments, the shape representation generation system 106 utilizes a medial axis to connect sample circles if those sample circles were determined based on the medial axis. Further, the shape representation generation system 106 can connect the centers of the sample circles if the sample circles were determined based on enclosing circles. However, the shape representation generation system 106 can connect the sample circles based on the medial axis or connect the centers of the sample circles regardless of how the sample circles were generated. By connecting the sample circles based on the medial axis of the digital shape or connecting the center points of the sample circles, the shape representation generation system 106 can flexibly connect the sample circles without user input as required by many conventional systems.

Thus, the shape representation generation system 106 can generate a sample circle representation for a digital shape. In particular, the shape representation generation system 106 can generate one or more sample circles for a digital shape based on a plurality of digital boundary points of the digital shape. The shape representation generation system 106 can further connect the sample circles. The algorithms and acts described with reference to FIGS. 3A-3G and FIG. 5A can comprise the corresponding structure for performing a step for generating a sample circle representation for a digital shape based on the plurality of digital boundary points. Alternatively, the algorithms and acts described with reference to FIGS. 4A-4G and FIG. 5B can comprise the corresponding structure for performing a step for generating a sample circle representation for a digital shape based on the plurality of digital boundary points.

Figure 6:
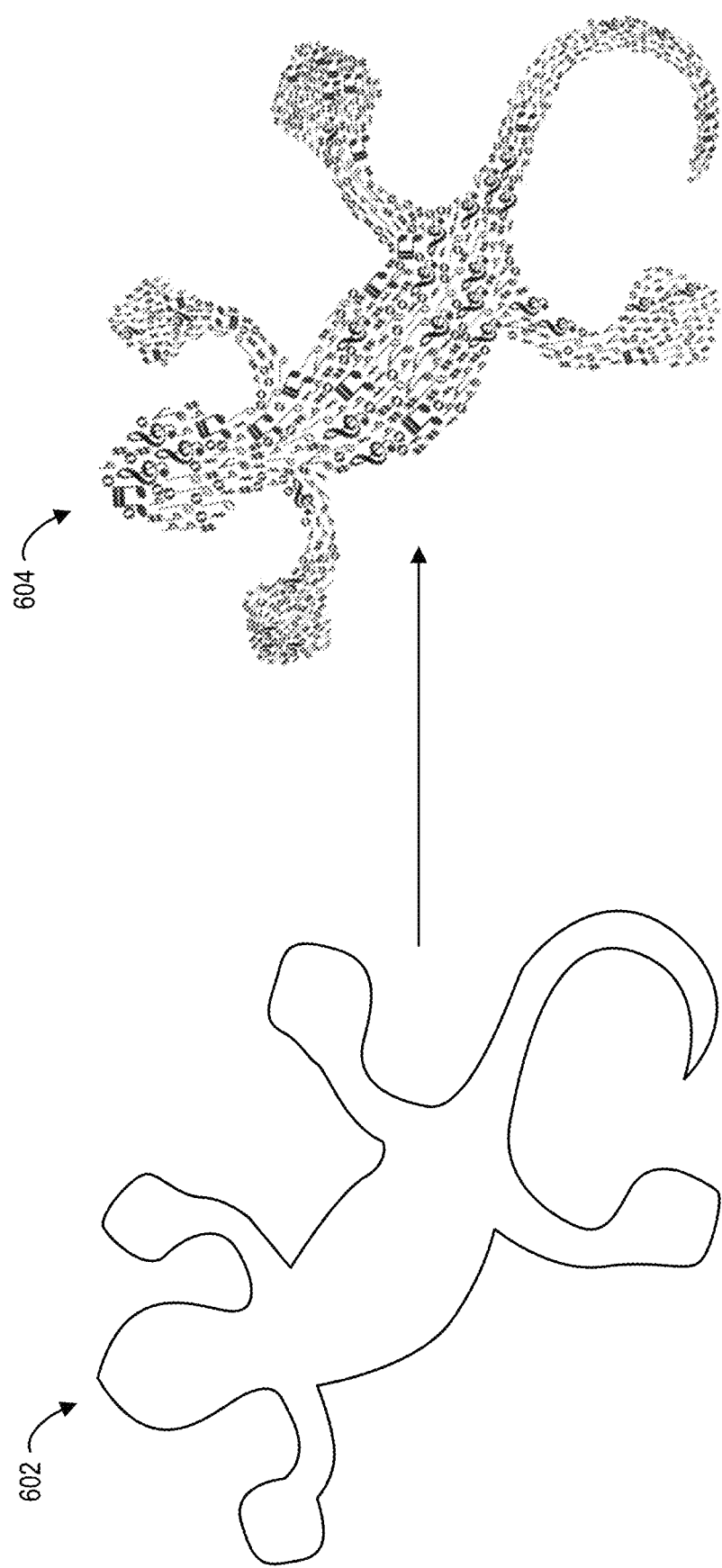
FIG. 6 illustrates a diagram for generating an enhanced graphical object using a sample circle representation in accordance with one or more embodiments.

In one or more embodiments, the shape representation generation system 106 applies a digital shape to one or more various tasks utilizing the corresponding sample circle representation. For example, the shape representation generation system 106 can generate an enhanced graphical object using the sample circle representation of a digital shape. FIG. 6 illustrates a diagram for generating an enhanced graphical object using a sample circle representation in accordance with one or more embodiments.

As shown in FIG. 6, the shape representation generation system 106 applies a plurality of digital shapes to a graphical object 602 to generate an enhanced graphical object 604. Though FIG. 6 illustrates applying a plurality of digital shapes to the graphical object 602, the shape representation generation system 106 can apply a single digital shape to the graphical object 602. Further, though FIG. 6 illustrates the graphical object 602 as a two-dimensional graphical object and the enhanced graphical object 604 as an enhanced two-dimensional graphical object, the shape representation generation system 106 can apply one or more digital shapes to a three-dimensional graphical object to generate an enhanced three-dimensional graphical object.

In one or more embodiments, the shape representation generation system 106 applies the plurality of digital shapes to the graphical object 602 using the sample circle representations corresponding to the digital shapes. For example, the shape representation generation system 106 can utilize the sample circle representations corresponding to the digital shapes to fill in the graphical object 602. The shape representation generation system 106 can further replace the sample circle representations with the corresponding digital shapes to generate the enhanced graphical object 604.

As shown in FIG. 6, the shape representation generation system 106 can modify one or more of the digital shapes applied to the graphical object 602 to generate the enhanced graphical object 604. In one or more embodiments, the shape representation generation system 106 modifies the one or more digital shapes by modifying their corresponding sample circle representations. For example, the shape representation generation system 106 can apply various deformations to the sample circle representations to stretch, compress, or otherwise modify the corresponding digital shapes. In one or more embodiments, the shape representation generation system 106 can modify a sample circle representation based on the connections between the sample circles included therein. For example, as discussed above, the shape representation generation system 106 can apply various flexible modifications to a sample circle representation having sample circles connected based on a medial axis of the digital shape while the shape representation generation system 106 only be able to apply more rigid modifications to a sample circle representation having the included sample circles connected at their center points. To illustrate, the shape representation generation system 106 may apply skeletal deformation (e.g., rotations around a joint, extension of a portion corresponding to a member of the skeleton, etc.) in addition to plastic deformations to sample circle representation having sample circles connected based on a medial axis. The shape representation system may be limited to certain deformations (e.g., rigid modeling of plastic deformations, such as twisting, stretching, or compressing) for sample circles connected at their center points. In one or more embodiments, because the sample circle representations approximate the corresponding digital shapes, the shape representation generation system 106 can replace the sample circle representations with the digital shapes without applying further modifications or adjustments to the digital shapes.

In one or more embodiments, the shape representation generation system 106 applies sample circle representations to graphical objects to generate enhanced graphical objects as described in Chen-Yuan Hsu et al., *Autocomplete Element Fields*, CHI 2020, https://hal.inria.fr/hal-02536205/, which is incorporated herein by reference in its entirety.

Though FIG. 6 illustrates a particular task, the shape representation generation system 106 can utilize sample circle representations to apply the corresponding digital shapes to various other tasks as well. For example, as mentioned above, the shape representation generation system 106 can further utilize sample circle representations to incorporate digital shapes into collision handling in physics simulations. For example, the shape representation generation system can model collisions with the sample circle representations in a more computationally efficient manner in contrast to modeling collisions with a complex digital shape itself. Similarly, the shape representation generation system can utilize sample circle representations as an initial rendering of a digital image (and then progressively render other levels of detail as bandwidth or resources permit). Similarly, the shape representation system can utilize a sample circle representation to determine shadow computation for global illumination (rather than the more computationally taxing computations associated with complex digital shapes).

Figure 7:
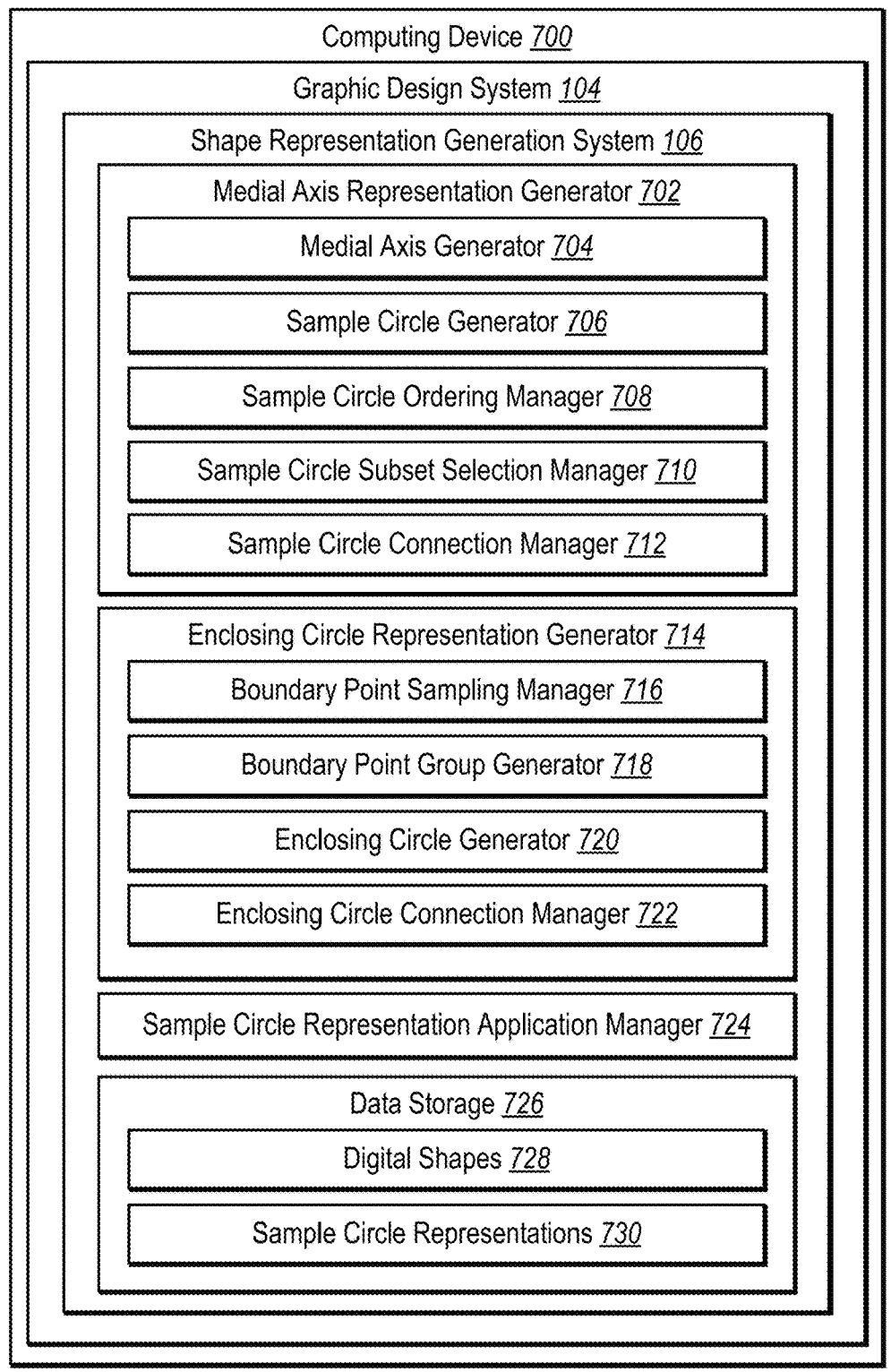
FIG. 7 illustrates an example schematic diagram of a shape representation generation system in accordance with one or more embodiments.

Turning now to FIG. 7, additional detail will be provided regarding various components and capabilities of the shape representation generation system 106. In particular, FIG. 7 illustrates the shape representation generation system 106 implemented by the computing device 700 (e.g., the server(s) 102 and/or one of the client devices 110*a*-110*n* as discussed above with reference to FIG. 1). Additionally, the shape representation generation system 106 is also part of the graphic design system 104. As shown, the shape representation generation system 106 can include, but is not limited to, a medial axis representation generator 702 (which includes a medial axis generator 704, a sample circle generator 706, a sample circle ordering manager 708, a sample circle subset selection manager 710, and a sample circle connection manager 712), an enclosing circle representation generator 714 (which includes a boundary point sampling manager 716, a boundary point group generator 718, an enclosing circle generator 720, and an enclosing circle connection manager 722), a sample circle representation application manager 724, and data storage 726 (which includes digital shapes 728 and sample circle representations 730).

As just mentioned, and as illustrated in FIG. 7, the shape representation generation system 106 includes the medial axis representation generator 702. In particular, the medial axis representation generator 702 can generate a sample circle representation for a digital shape based on the medial axis of the digital shape. The medial axis representation generator 702 includes the medial axis generator 704, the sample circle generator 706, the sample circle ordering manager 708, the sample circle subset selection manager 710, and the sample circle connection manager 712.

The medial axis generator 704 can determine the medial axis for the digital shape. The sample circle generator 706 can generate a plurality of sample circles based on the medial axis. The sample circle ordering manager 708 can determine an ordering of the plurality of sample circles (e.g., based on size). The sample circle subset selection manager 710 can select a subset of sample circles from the plurality of sample circles to be used for the sample circle representation. For example, the sample circle subset selection manager 710 can add or exclude a given sample circle to the subset of sample circles based on determining whether the given sample circle and an adjacent sample circle that has already been added to the subset satisfy an overlap threshold. The sample circle connection manager 712 can connect the subset of sample circles used for the sample circle representation. For example, the sample circle connection manager 712 can connect the subset of sample circles based on the medial axis for the digital shape.

Further, as shown in FIG. 7, the shape representation generation system 106 includes the enclosing circle representation generator 714. In particular, the enclosing circle representation generator 714 generates a sample circle representation for a digital shape that includes enclosing circles for groups of digital boundary points of the digital shape. The enclosing circle representation generator 714 includes the boundary point sampling manager 716, the boundary point group generator 718, the enclosing circle generator 720, and the enclosing circle connection manager 722.

The boundary point sampling manager 716 can determine one or more sampled boundary points by sampling one or more digital boundary points of the digital shape. For example, the boundary point sampling manager 716 can sample one or more digital boundary points based on a number of samples indicated by user input or other factors. The boundary point group generator 718 can generate one or more groups of digital boundary points corresponding to the one or more sampled boundary points. In particular, the boundary point group generator 718 can add a given digital boundary point to a group of digital boundary points that corresponds to a nearest sampled boundary point. The boundary point group generator 718 can further move digital boundary points between groups of digital boundary points corresponding to generated enclosing circles based on the proximities of those digital boundary points to the center points of the enclosing circles. The enclosing circle generator 720 can generate one or more enclosing circles for the one or more groups of digital boundary points. Further, the enclosing circle generator 720 can modify the one or more enclosing circles based on modifications to the groups of digital boundary points corresponding to the one or more enclosing circles. The enclosing circle connection manager 722 can connect the enclosing circles used for the sample circle representation of the digital shape. For example, the enclosing circle connection manager 722 can connect the centers of the enclosing circles.

Additionally, as shown in FIG. 7, the shape representation generation system 106 includes the sample circle representation application manager 724. In particular, the sample circle representation application manager 724 can apply the sample circle representation of a digital shape to various tasks. Specifically, the sample circle representation application manager 724 can applying a digital shape to various tasks using the corresponding sample circle representation. For example, the sample circle representation application manager 724 can utilize a sample circle representation to apply a digital shape to a graphical object in order to generate an enhanced graphical object.

As further shown in FIG. 7, the shape representation generation system 106 includes data storage 726. In particular, data storage 726 includes digital shapes 728 and sample circle representations 730. Digital shapes 728 can store the digital shapes used in generating sample circle representations and applied to various tasks (e.g., generating an enhanced graphical object). Sample circle representations 730 can store the sample circle representations for digital shapes generated by the medial axis representation generator 702 and/or the enclosing circle representation generator 714.

Each of the components 702-730 of the shape representation generation system 106 can include software, hardware, or both. For example, the components 702-730 can include one or more instructions stored on a computer-readable storage medium and executable by processors of one or more computing devices, such as a client device or server device. When executed by the one or more processors, the computer-executable instructions of the shape representation generation system 106 can cause the computing device(s) to perform the methods described herein. Alternatively, the components 702-730 can include hardware, such as a special-purpose processing device to perform a certain function or group of functions. Alternatively, the components 702-730 of the shape representation generation system 106 can include a combination of computer-executable instructions and hardware.

Furthermore, the components 702-730 of the shape representation generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-730 of the shape representation generation system 106 may be implemented as a stand-alone application, such as a desktop or mobile application. Furthermore, the components 702-730 of the shape representation generation system 106 may be implemented as one or more web-based applications hosted on a remote server. Alternatively, or additionally, the components 702-730 of the shape representation generation system 106 may be implemented in a suite of mobile device applications or "apps." For example, in one or more embodiments, the shape representation generation system 106 can comprise or operate in connection with digital software applications such as ADOBE® ILLUSTRATOR® or ADOBE® INDESIGN®. "ADOBE," "ILLUSTRATOR," and "INDESIGN" are either registered trademarks or trademarks of Adobe Inc. in the United States and/or other countries.

Figure 8:
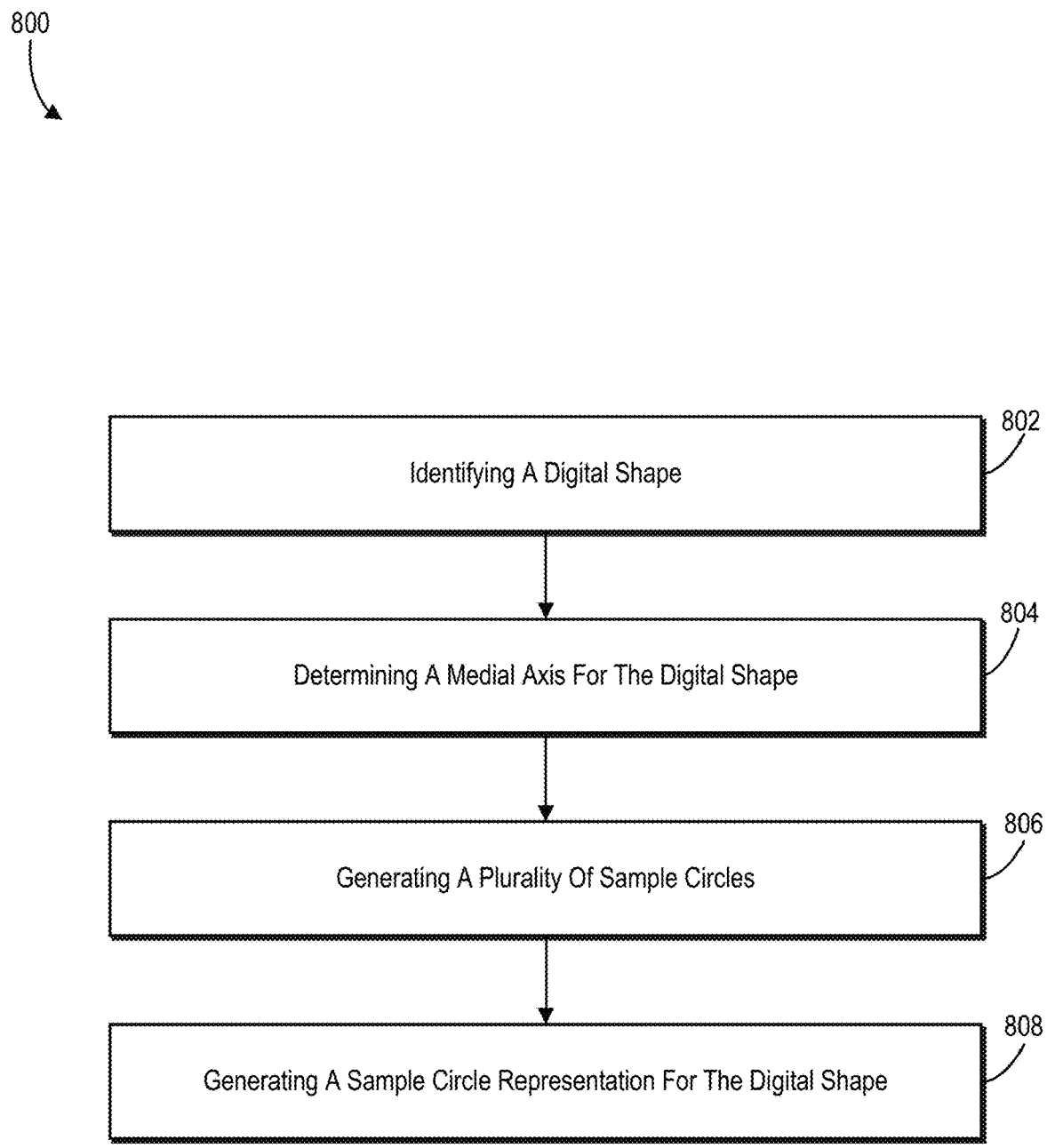
FIG. 8 illustrates a flowchart of a series of acts for generating a sample circle representation for a digital shape using a medial axis corresponding to the digital shape in accordance with one or more embodiments.
Figure 9:
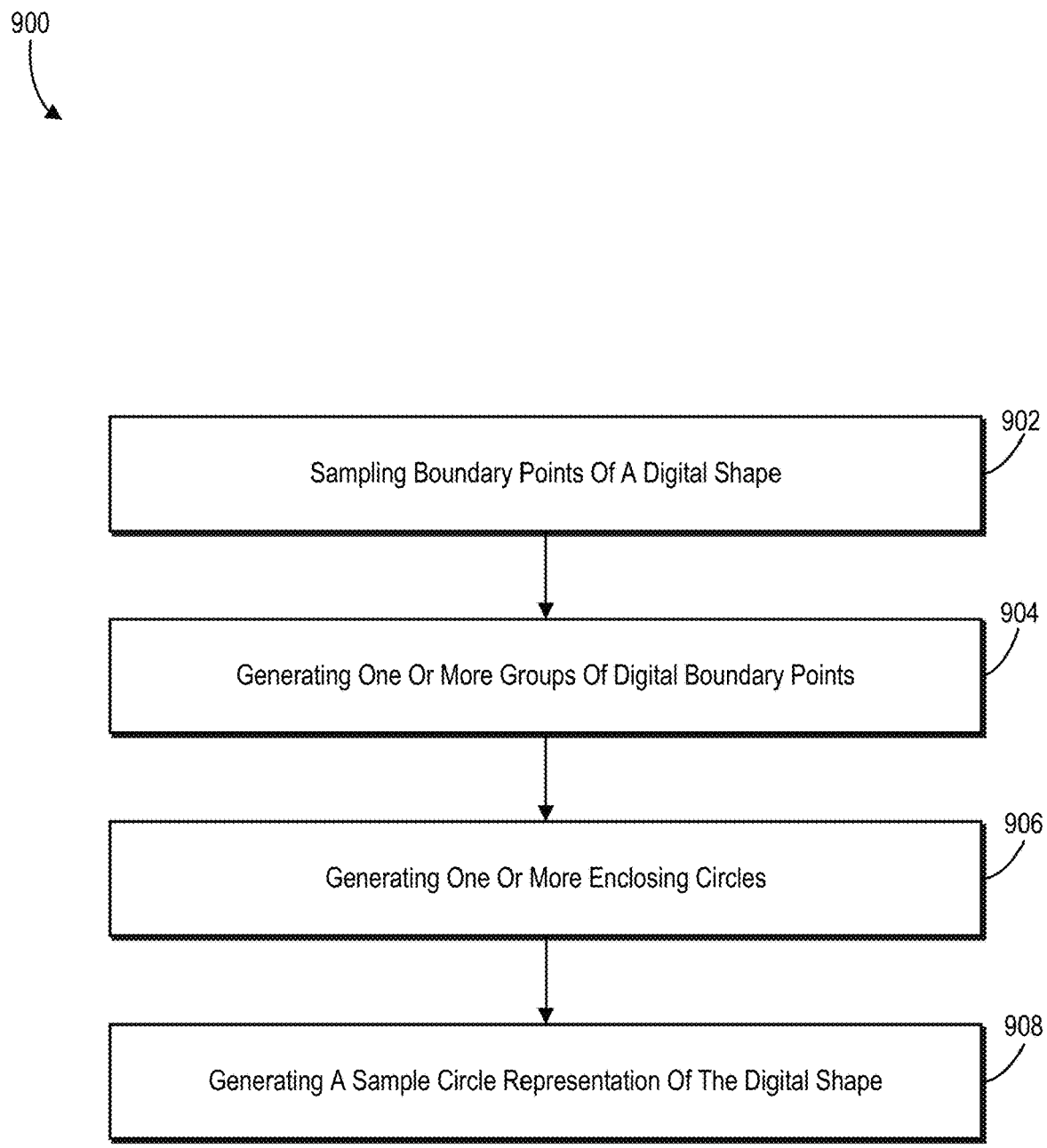
FIG. 9 illustrates a flowchart of a series of acts for generating a sample circle representation for a digital shape using one or more enclosing circles in accordance with one or more embodiments.

FIGS. 1-7, the corresponding text and the examples provide a number of different methods, systems, devices, and non-transitory computer-readable media of the shape representation generation system 106. In addition to the foregoing, one or more embodiments can also be described in terms of flowcharts comprising acts for accomplishing the particular results, as shown in FIGS. 8-9. FIGS. 8-9 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for generating a sample circle representation for a digital shape using a medial axis corresponding to the digital shape in accordance with one or more embodiments. While FIG. 8 illustrates acts according to one embodiment, alternative embodiments may omit, add to, reorder and/or modify any of the acts shown in FIG. 8. The acts of FIG. 8 can be performed as part of a method. For example, in some embodiments, the acts of FIG. 8 can be performed, in a digital media environment for generating graphical designs, as part of a computer-implemented method for generating digital shape approximations. Alternatively, a non-transitory computer-readable medium can store instructions thereon that, when executed by at least one processor, cause a computing device to perform the acts of FIG. 8. In some embodiments, a system can perform the acts of FIG. 8. For example, in one or more embodiments, a system includes one or more memory devices comprising a digital shape comprising a plurality of digital boundary points. The system can further include one or more server devices configured to cause the system to perform the acts of FIG. 8.

The series of acts 800 includes an act 802 of identifying a digital shape. For example, the act 802 can involve identifying a digital shape comprising a plurality of digital boundary points. In one or more embodiments, the shape representation generation system 106 identifies a digital shape comprising one or more boundaries. The shape representation generation system 106 can further determine a plurality of digital boundary points for the one or more boundaries of the digital shape.

The series of acts 800 also includes an act 804 of determining a medial axis for the digital shape. For example, the act 804 can involve determining a medial axis for the digital shape based on the plurality of digital boundary points, the medial axis comprising a plurality of digital medial axis points.

The series of acts 800 further includes an act 806 of generating a plurality of sample circles. For example, the act 806 can involve generating a plurality of sample circles based on the plurality of digital medial axis points by generating a given sample circle centered around a corresponding digital medial axis point. In one or more embodiments, the shape representation generation system 106 generates the plurality of sample circles by generating sample circles enclosed by the plurality of digital boundary points of the digital shape.

Additionally, the series of acts 800 includes an act 808 of generating a sample circle representation for the digital shape. For example, the act 808 can involve generating a sample circle representation for the digital shape by selecting, from the plurality of sample circles, a subset of sample circles that satisfy an overlap threshold. In one or more embodiments, the shape representation generation system 106 determines an ordering of the plurality of sample circles based on size. Accordingly, selecting the subset of sample circles can include selecting one or more sample circles based on the ordering of the plurality of sample circles.

In one or more embodiments, selecting the subset of sample circles that satisfy the overlap threshold comprises: adding a first sample circle from the plurality of sample circles to the subset of sample circles; identifying a second sample circle from the plurality of sample circles based on the ordering of the plurality of sample circles; determining that the second sample circle and the first sample circle satisfy the overlap threshold; and adding the second sample circle to the subset of sample circles based on determining that the second sample circle and the first sample circle satisfy the overlap threshold. In some embodiments, selecting the subset of sample circles that satisfy the overlap threshold comprises: adding a first sample circle from the plurality of sample circles to the subset of sample circles; identifying a second sample circle from the plurality of sample circles; determining that the second sample circle and the first sample circle overlap more than the overlap threshold; and excluding the second sample circle from the subset of sample circles based on determining that the second sample circle and the first sample circle overlap more than the overlap threshold.

In one or more embodiments, the shape representation generation system 106 generates the sample circle representation by further connecting the subset of sample circles based on the medial axis for the digital shape. Indeed, in one or more embodiments, the sample circle representation comprises a plurality of sample circles that are enclosed by the digital shape and connected based on a medial axis of the digital shape.

In one or more embodiments, the series of acts 800 further includes acts for applying the digital shape to one or more tasks using the corresponding sample circle representation. For example, in one or more embodiments, the acts include applying, based on the sample circle representation for the digital shape, the digital shape to a two-dimensional graphical object or a three-dimensional graphical object. In particular, the shape representation generation system 106 can generate an enhanced two-dimensional graphical object or an enhanced three-dimensional graphical object by applying, based on the sample circle representation for the digital shape, the digital shape to a two-dimensional graphical object or a three-dimensional graphical object.

FIG. 9 illustrates a flowchart of a series of acts 900 for generating a sample circle representation for a digital shape using one or more enclosing circles in accordance with one or more embodiments. While FIG. 9 illustrates acts according to one embodiment, alternative embodiments may omit, add to, reorder and/or modify any of the acts shown in FIG. 9. The acts of FIG. 9 can be performed as part of a method. For example, in some embodiments, the acts of FIG. 9 can be performed, in a digital media environment for generating graphical designs, as part of a computer-implemented method for generating digital shape approximations. Alternatively, a non-transitory computer-readable medium can store instructions thereon that, when executed by at least one processor, cause a computing device to perform the acts of FIG. 9. In some embodiments, a system can perform the acts of FIG. 9. For example, in one or more embodiments, a system includes one or more memory devices comprising a digital shape comprising a plurality of digital boundary points. The system can further include one or more server devices configured to cause the system to perform the acts of FIG. 9.

The series of acts 900 includes an act 902 of sampling boundary points of a digital shape. For example, the act 902 can involve sampling one or more digital boundary points from the plurality of digital boundary points of the digital shape to determine one or more sampled boundary points. In one or more embodiments, the shape representation generation system 106 determines a number of samples based on user input and samples the one or more digital boundary points from the plurality of digital boundary points based on the number of samples.

The series of acts 900 also includes an act 904 of generating one or more groups of digital boundary points. For example, the act 904 can involve generating one or more groups of digital boundary points corresponding to the one or more sampled boundary points. In particular, the shape representation generation system 106 can generate one or more groups of digital boundary points corresponding to the one or more sampled boundary points by, for a first digital boundary point of the plurality of digital boundary points: identifying a first sampled boundary point nearest to the first digital boundary point; and adding the first digital boundary point to a first group of digital boundary points corresponding to the first sampled boundary point nearest to the first digital boundary point.

Additionally, the series of acts 900 includes an act 906 of generating one or more enclosing circles. For example, the act 906 can involve generating one or more enclosing circles for the one or more groups of digital boundary points.

Further, the series of acts 900 includes an act 908 of generating a sample circle representation of the digital shape. For example, the act 908 can involve generating a sample circle representation of the digital shape utilizing the one or more enclosing circles.

In one or more embodiments, the shape representation generation system 106 iteratively modifies the one or more enclosing circles based on proximities of the plurality of digital boundary points to center points of the one or more enclosing circles to generate one or more modified enclosing circles. Accordingly, the shape representation generation system 106 can generate the sample circle representation of the digital shape utilizing the one or more enclosing circles by generating the sample circle representation utilizing the one or more modified enclosing circles. In one or more embodiments, the shape representation generation system 106 iteratively modifies the one or more enclosing circles based on the proximities of the plurality of digital boundary points to the center points of the one or more enclosing circles to generate the one or more modified enclosing circles by, for a given iteration: identifying a digital boundary point associated with a first enclosing circle; determining that a first distance between the digital boundary point and a center point of the first enclosing circle is greater than a second distance between the digital boundary point and a center point of a second enclosing circle; adding the digital boundary point to a group of digital boundary points corresponding to the second enclosing circle based on determining that the first distance is greater than the second distance; and generating modified enclosing circles based on adding the digital boundary point to the group of digital boundary points corresponding to the second enclosing circle.

In one or more embodiments, the shape representation generation system 106 iteratively modifies the one or more enclosing circles by: determining a threshold change to the one or more enclosing circles between iterations; and iteratively modifying the one or more enclosing circles until the one or more enclosing circles change less than the threshold change. In some embodiments, the shape representation generation system 106 iteratively modifies the one or more enclosing circles by: determining a maximum number of iterations based on user input; and iteratively modifying the one or more enclosing circles based on the maximum number of iterations.

In one or more embodiments, the one or more enclosing circles comprises a plurality of enclosing circles. The shape representation generation system 106 can generate the sample circle representation of the digital shape utilizing the one or more enclosing circles by connecting center points associated with the plurality of enclosing circles. Indeed, in one or more embodiments, the sample circle representation comprises a plurality of sample circles that encompass the digital shape and are connected at centers of the plurality of sample circles.

In one or more embodiments, the series of acts 900 further includes acts for generating various numbers of enclosing circles for a digital shape and utilizing one of the numbers of enclosing circles for generating the sample circle representation. For example, in one or more embodiments, the one or more enclosing circles comprises a first number of enclosing circles corresponding to a first number of sampled boundary points. Accordingly, the acts can include generating a second number of enclosing circles corresponding to a second number of sampled boundary points; and generating the sample circle representation of the digital shape utilizing the one or more enclosing circles by generating the sample circle representation utilizing the first number of enclosing circles or the second number of enclosing circles. In one or more embodiments, generating the sample circle representation utilizing the first number of enclosing circles or the second number of enclosing circles comprises: determining that a second total area associated with the second number of enclosing circles is greater than a first total area associated with the first number of enclosing circles; and generating the sample circle representation utilizing the first number of enclosing circles based on determining that the second total area is greater than the first total area.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
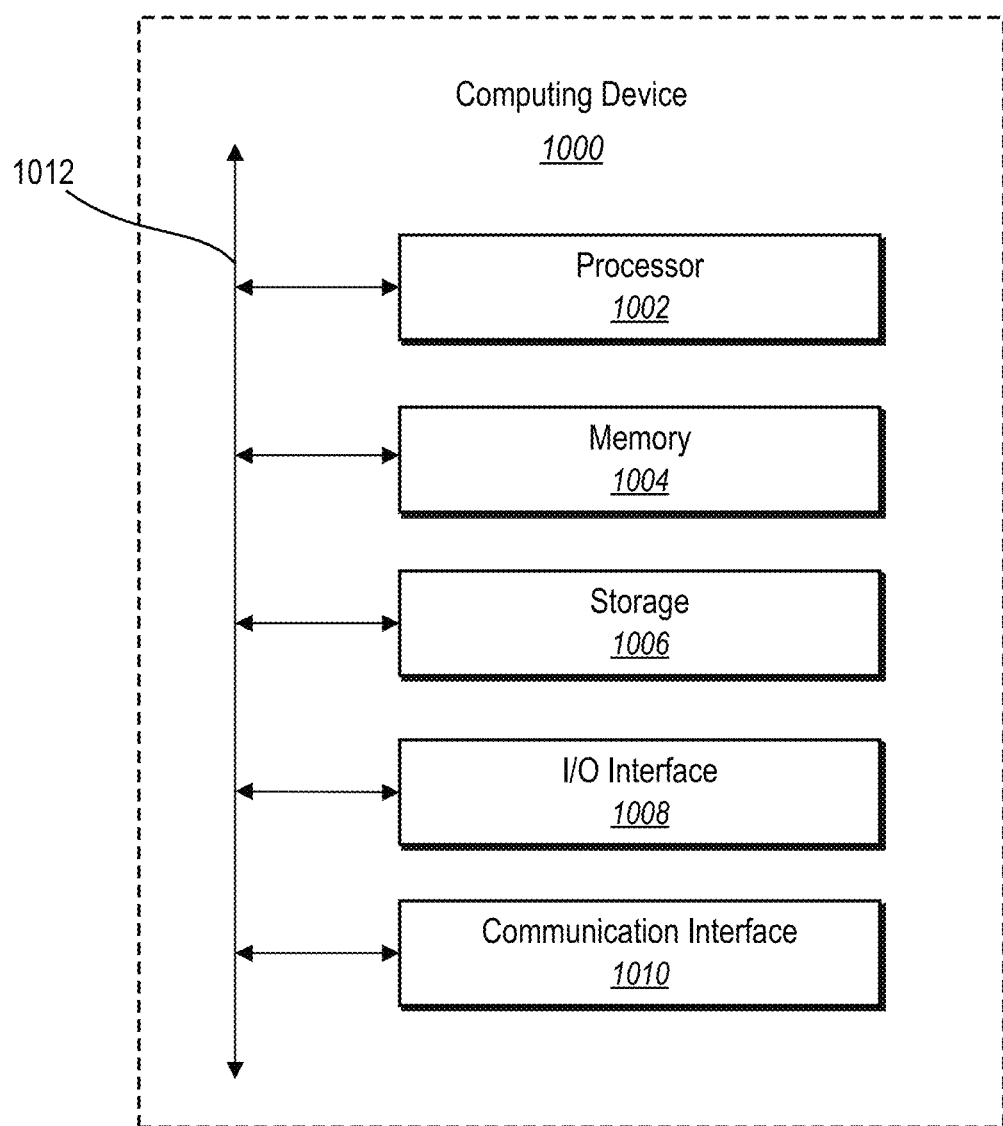
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102 and/or the client devices 110a-110n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause a computing device to:
   identify a digital shape comprising a plurality of digital boundary points;
   determine a medial axis for the digital shape based on the plurality of digital boundary points, the medial axis comprising a plurality of digital medial axis points;
   generate a plurality of medial axis sample circles based on the plurality of digital medial axis points by generating each medial axis sample circle to include a center point at a corresponding digital medial axis point;
   determine a subset of medial axis sample circles from the plurality of medial axis sample circles by selecting, for inclusion within the subset, medial axis sample circles that satisfy an overlap threshold and excluding, from the subset, one or more medial axis sample circles that fail to satisfy the overlap threshold; and
   generate a sample circle representation for the digital shape using the subset of medial axis circles.

2. The non-transitory computer-readable medium of claim 1, further comprising instructions that, when executed by the at least one processor, cause the computing device to determine an ordering of the plurality of medial axis sample circles based on size,
   wherein determining the subset of medial axis sample circles from the plurality of medial axis sample circles comprises determining the subset of medial axis sample circles based on the ordering of the plurality of medial axis sample circles.

3. The non-transitory computer-readable medium of claim 2, wherein selecting, for inclusion within the subset, the medial axis sample circles that satisfy the overlap threshold comprises:
   adding a first medial axis sample circle from the ordering of the plurality of medial axis sample circles to the subset of medial axis sample circles;
   identifying a second medial axis sample circle that follows the first medial axis sample circle in the ordering of the plurality of medial axis sample circles;
   determining that the second medial axis sample circle and the first medial axis sample circle satisfy the overlap threshold; and
   adding the second medial axis sample circle to the subset of medial axis sample circles based on determining that the second medial axis sample circle and the first medial axis sample circle satisfy the overlap threshold.

4. The non-transitory computer-readable medium of claim 2, wherein excluding, from the subset, one or more medial axis sample circles that fail to satisfy the overlap threshold comprises:
   adding a first medial axis sample circle from the ordering of the plurality of medial axis sample circles to the subset of medial axis sample circles;
   identifying a second medial axis sample circle that follows the first medial axis sample circle in the ordering of the plurality of medial axis sample circles;
   determining that the second medial axis sample circle and the first medial axis sample circle overlap more than the overlap threshold; and
   excluding the second medial axis sample circle from the subset of medial axis sample circles based on determining that the second medial axis sample circle and the first medial axis sample circle overlap more than the overlap threshold.

5. The non-transitory computer-readable medium of claim 1, further comprising instructions that, when executed by the at least one processor, cause the computing device to generate the sample circle representation by connecting the subset of medial axis sample circles based on the medial axis for the digital shape.

6. The non-transitory computer-readable medium of claim 1, further comprising instructions that, when executed by the at least one processor, cause the computing device to generate an enhanced two-dimensional graphical object or an enhanced three-dimensional graphical object by applying, based on the sample circle representation for the digital shape, the digital shape to a two-dimensional graphical object or a three-dimensional graphical object.

7. The non-transitory computer-readable medium of claim 1, further comprising instructions that, when executed by the at least one processor, cause the computing device to generate the plurality of medial axis sample circles by generating medial axis sample circles enclosed by the plurality of digital boundary points of the digital shape.

8. A system comprising:
   one or more memory devices comprising a digital shape comprising a plurality of digital boundary points; and
   one or more server devices configured to cause the system to:

sample one or more digital boundary points from the plurality of digital boundary points of the digital shape to determine one or more sampled boundary points;
generate one or more groups of digital boundary points corresponding to the one or more sampled boundary points by, for a first digital boundary point of the plurality of digital boundary points:
identifying a first sampled boundary point nearest to the first digital boundary point; and
adding the first digital boundary point to a first group of digital boundary points corresponding to the first sampled boundary point nearest to the first digital boundary point;
generate one or more enclosing circles for the one or more groups of digital boundary points, wherein each enclosing circle encloses a corresponding group of digital boundary points and a portion of the digital shape, and at least one enclosing circle encompasses an area external to the digital shape; and
generate a sample circle representation of the digital shape utilizing the one or more enclosing circles.

9. The system of claim 8, wherein the one or more server devices are further configured to cause the system to:
iteratively modify the one or more enclosing circles based on proximities of the plurality of digital boundary points to center points of the one or more enclosing circles to generate one or more modified enclosing circles; and
generate the sample circle representation of the digital shape utilizing the one or more enclosing circles by generating the sample circle representation utilizing the one or more modified enclosing circles.

10. The system of claim 9, wherein the one or more server devices are configured to iteratively modify the one or more enclosing circles based on the proximities of the plurality of digital boundary points to the center points of the one or more enclosing circles to generate the one or more modified enclosing circles by, for a given iteration:
identifying a digital boundary point associated with a first enclosing circle;
determining that a first distance between the digital boundary point and a center point of the first enclosing circle is greater than a second distance between the digital boundary point and a center point of a second enclosing circle;
adding the digital boundary point to a group of digital boundary points corresponding to the second enclosing circle based on determining that the first distance is greater than the second distance; and
generating modified enclosing circles based on adding the digital boundary point to the group of digital boundary points corresponding to the second enclosing circle.

11. The system of claim 9, wherein the one or more server devices are configured to iteratively modify the one or more enclosing circles by:
determining a threshold change to the one or more enclosing circles between iterations; and
iteratively modifying the one or more enclosing circles until the one or more enclosing circles change less than the threshold change.

12. The system of claim 9, the one or more server devices are configured to iteratively modify the one or more enclosing circles by:
determining a maximum number of iterations based on user input; and
iteratively modifying the one or more enclosing circles based on the maximum number of iterations.

13. The system of claim 8, wherein:
the one or more enclosing circles comprises a first number of enclosing circles corresponding to a first number of sampled boundary points; and
the one or more server devices are further configured to cause the system to:
generate a second number of enclosing circles corresponding to a second number of sampled boundary points; and
generate the sample circle representation of the digital shape utilizing the one or more enclosing circles by generating the sample circle representation utilizing the first number of enclosing circles or the second number of enclosing circles.

14. The system of claim 13, wherein generating the sample circle representation utilizing the first number of enclosing circles or the second number of enclosing circles comprises:
determining that a second total area associated with the second number of enclosing circles is greater than a first total area associated with the first number of enclosing circles; and
generating the sample circle representation utilizing the first number of enclosing circles based on determining that the second total area is greater than the first total area.

15. The system of claim 8, wherein the one or more server devices are further configured to cause the system to:
determine a number of samples based on user input; and
sample the one or more digital boundary points from the plurality of digital boundary points based on the number of samples.

16. The system of claim 8, wherein:
the one or more enclosing circles comprises a plurality of enclosing circles; and
the one or more server devices are configured to cause the system to generate the sample circle representation of the digital shape utilizing the one or more enclosing circles by connecting center points associated with the plurality of enclosing circles.

17. In a digital media environment for generating graphical designs, a computer-implemented method for generating digital shape approximations comprising:
sampling one or more digital boundary points from a plurality of digital boundary points of a digital shape to determine one or more sampled boundary points;
generating one or more groups of digital boundary points corresponding to the one or more sampled boundary points by, for a first digital boundary point of the plurality of digital boundary points:
identifying a first sampled boundary point nearest to the first digital boundary point; and
adding the first digital boundary point to a first group of digital boundary points corresponding to the first sampled boundary point nearest to the first digital boundary point;
generating one or more enclosing circles for the one or more groups of digital boundary points, wherein each enclosing circle encloses a corresponding group of digital boundary points and a portion of the digital shape, and at least one enclosing circle encompasses an area external to the digital shape; and
generating a sample circle representation of the digital shape utilizing the one or more enclosing circles.

18. The computer-implemented method of claim 17, further comprising applying, based on the sample circle representation for the digital shape, the digital shape to a two-dimensional graphical object or a three-dimensional graphical object.

19. The computer-implemented method of claim 17, further comprising:
- iteratively modifying the one or more enclosing circles based on proximities of the plurality of digital boundary points to center points of the one or more enclosing circles to generate one or more modified enclosing circles; and
- generating the sample circle representation of the digital shape utilizing the one or more enclosing circles by generating the sample circle representation utilizing the one or more modified enclosing circles.

20. The computer-implemented method of claim 17, wherein iteratively modifying the one or more enclosing circles comprises:
- determining a threshold change to the one or more enclosing circles between iterations; and
- iteratively modifying the one or more enclosing circles until the one or more enclosing circles change less than the threshold change.

* * * * *